United States Patent [19]
Suzuki et al.

[11] Patent Number: 5,567,997
[45] Date of Patent: Oct. 22, 1996

[54] THREE-VALUE POWER SUPPLY DEVICE AND IMAGE FORMING APPARATUS UTILIZING THE SAME

[75] Inventors: Koji Suzuki, Yokohama; Hiroshi Saito, Kawasaki, both of Japan

[73] Assignee: Canon Kabushiki Kaisha, Tokyo, Japan

[21] Appl. No.: 97,000

[22] Filed: Jul. 27, 1993

[30] Foreign Application Priority Data

Jul. 28, 1992 [JP] Japan .................................. 4-201008
Oct. 29, 1992 [JP] Japan .................................. 4-291201

[51] Int. Cl.⁶ .................................................. H02M 3/00
[52] U.S. Cl. .............................. 307/127; 363/21; 363/71; 378/111
[58] Field of Search .............................. 307/127; 363/21, 363/71; 365/265, 246; 355/202, 209; 378/111, 112; 345/52

[56] References Cited

U.S. PATENT DOCUMENTS

| | | | |
|---|---|---|---|
| 4,747,012 | 5/1988 | Maebra et al. | 361/25 |
| 4,868,729 | 9/1989 | Suzuki et al. | 363/21 |
| 5,173,847 | 12/1992 | Suzuki | 363/21 |
| 5,229,818 | 7/1993 | Nakahara et al. | 355/219 |

*Primary Examiner*—Jonathan Wysocki
*Assistant Examiner*—Albert W. Paladini
*Attorney, Agent, or Firm*—Fitzpatrick, Cella, Harper & Scinto

[57] ABSTRACT

Disclosed is a three-value power supply device, adapted for supplying developing bias voltages to a copying machine. The device comprises a positive high voltage source, a negative high voltage source, first and second high voltage transistors serially connected between the positive and negative high voltage sources, with an output terminal connected to the junction point between two transistors, and a timing controller for selectively turning on and off the two transistors.

19 Claims, 33 Drawing Sheets

THREE-VALUE POWER SUPPLY DEVICE AND IMAGE FORMING APPARATUS UTILIZING THE SAME

BACKGROUND OF THE INVENTION

1. Field of the Invention

The present invention relates to a three-value power supply device adapted for use for the developing bias in an electrophotographic copying machine, a printer or a similar image forming apparatus, and an image forming apparatus utilizing said power supply device.

2. Related Background Art

Conventionally a sinusoidal or rectangular AC high voltage has been employed for the developing bias in the above-mentioned image forming apparatus. Also recently, rectangular waves of deviated duty ratios such as 4:6 or 3:7 are employed for improving the developing performance.

The sinusoidal wave or the rectangular wave of a duty ratio of 1:1 are generally obtained by elevating the voltage of a sinusoidal or square wave with a voltage elevating transformer. A DC high voltage to be superposed is generated by a DC-DC converter or the like and is supplied to an end of the secondary coil of said voltage elevating transformer.

The rectangular wave of the deviated duty ratio is generated by a method of modulating the primary and secondary sides of a high-frequency DC-DC converter with a low frequency.

On the other hand, for improving the developing performance, particularly for a high resolving power by preventing the toner scattering, there is required a three-value AC bias, or an AC high voltage having three levels of positive, negative and intermediate values. Also for improving the image quality, effective is faster upshift and downshift of the output wave form.

However, in comparison with the ordinary developing bias wave of a relatively low frequency in a range from several hundred Hz to 2 KHz, the positive and negative basic frequencies of the three-value bias are as high as 8 KHz, so that there is required a significant improvement in the upshift and downshift speeds.

Also the forming means for the intermediate level has been associated with the following drawbacks;

(1) The addition of a selector switch for the intermediate level involves a bidirectional switching circuit of a high speed and a high voltage resistance, and is practically unacceptable in consideration of the complication of the apparatus, and the increase in volume and cost, including the control circuit;

(2) Also to realize the intermediate level by the discharge resistance only is not practical because of the significant power loss in said resistance;

(3) A method of switching to a side only a timing of switching to the intermediate level and maintaining the intermediate level by a discharge resistance when the voltage comes close to said level has a drawback of very slow convergence to the intermediate level or a large overshoot for example because of fluctuation in the floating capacitance;

(4) In a method of supplying the load with positive and negative outputs of DC high-voltage power source by selective switching with positive and negative high-voltage switches, if semiconductor switch devices are employed, such switch remains conductive by the feedback capacitance thereof even after the input signal is shut off at the timing of switching, thereby leading to a lowered upshift speed of output or a power loss.

SUMMARY OF THE INVENTION

In consideration of the foregoing, the object of the present invention is to provide a three-value power supply device of a high upshift or downshift speed, and an image forming apparatus of a high resolving power.

The foregoing object can be attained, according to the present invention, by a three-value power supply device or an image forming apparatus in the following embodiments (1)–(13):

(1) A three-value power supply device having a high frequency-driven converter of a positive output; a high frequency-driven converter of a negative output; and high-speed switch for supplying or not supplying the output terminal with the positive or negative output of one of the high frequency-driven converters at desired timings of a frequency sufficiently lower than the high frequency;

(2) A three-value power supply device provided with a high frequency-driven converter of a positive output, a high frequency-driven converter of a negative output, and a high-speed switch for supplying or not supplying the output terminal with the positive or negative output at desired timings of a frequency sufficiently lower than the high frequency. The device includes an amplitude detector for individually detecting the amplitudes of the positive and negative outputs appearing at the output terminal; a first comparator for comparing the amplitude of the positive output, detected by the amplitude detector, with a first reference value; a second comparator for comparing the amplitude of the negative output, detected by the amplitude detector, with a second reference value; a first high-frequency driver controlled by the output of the first comparator and adapted to drive the high frequency-driven converter of the positive output; and a second high-frequency driver controlled by the output of the second comparator and adapted to drive the high frequency-driven converter of the negative output;

(3) A three-value power supply device having a high frequency-driven converter of a positive output; a high frequency-driven converter of a negative output; an output terminal receiving the outputs of the two converters; and a high-speed switch for supplying the primary side of converting transformers of the two converters with a high frequency signal, at desired timings of a frequency sufficiently lower than the high frequency, or short circuiting the primary side thereby supplying or not supplying the output terminal with the positive or negative output;

(4) A three-value power supply device including a high voltage power source of a positive output; a high voltage power source of a negative output; first and second switching elements serially connected between the high voltage power sources of positive and negative outputs; a timing control device for selectively turning on and off the first and second switching elements; and an output terminal connected to the junction point between the first and second switching elements;

(5) A three-value power supply device according to (1), wherein the timing control device is adapted to selectively turn on the first or second switching element only for a desired duration, at a timing when the output potential is switched from the positive or negative peak to the intermediate level;

(6) A three-value power supply device including a high-voltage power source of a positive output; a high-voltage power source of a negative output; first and second switching elements serially connected between the high-voltage power sources of positive and negative outputs; an output terminal connected to the junction point between the first and second switching elements; an output detector for detecting the output of the output terminal; a comparator for comparing the output of the output detector with a reference signal; and a controller for selectively turning on and off the first and second switching elements;

(7) A three-value power supply device having a high-voltage power source of a positive output; a high-voltage power source of a negative output; first and second switching elements serially connected between the high-voltage power sources of positive and negative outputs; an output terminal connected to the junction point between the first and second switching elements; an output detector means for detecting the output at the output terminal; two comparators for comparing the output of the output detector with reference signals at mutually opposite polarities; and two controllers for generating PWM signals to be supplied to the first and second switching elements, according to the outputs of the two comparators;

(8) A three-value power supply device as described above, in which first and second switching elements are associated with a constant-current driving circuit for constant-current driving of the switching elements, and a saturation blocking circuit for preventing that the on-voltage of the switching elements becomes lower than a predetermined level;

(9) A three-value power supply device having a high-voltage generator of a positive output; a high-voltage generator of a negative output; a positive-side switch for on/off supply control of the output of the high-voltage generator of positive output to an output terminal; a negative-side switch for on/off supply control of the output of the high-voltage generator of negative output to the output terminal; and a timing control device for on/off control, at the timings of output level switching, of each of the high-voltage generator of positive output, the high-voltage generator of negative output, the positive-side switch and the negative-side switch;

(10) A three-value power supply device as described in the foregoing paragraph, in which the timing control device is adapted, at the switching of the output at the output terminal from positive to negative value, to turn off the positive-side a predetermined amount of time before turning-on of the negative-side switch;

(11) A three-value power supply device as described above in paragraph 9, in which the timing control device is adapted, at the switching of the output at the output terminal from positive to negative value, to turn on the high-voltage generator of negative output a predetermined amount of time before turning-off the high-voltage generator of positive output;

(12) A three-value power supply device as described in paragraphs (10) or (11), in which the timing control device is adapted, also at the switching of the output at the output terminal from negative to positive value, to turn off the negative-side switch or to turn on the high-voltage generator of positive output, earlier by a predetermined time; and

(13) An image forming apparatus in which the developing bias is obtained by superposing, with the output of a desired DC power source, the output of a three-value power supply device according to any of paragraph (1) to (12).

The configuration according to paragraph (1) to (12) provide three-value outputs at desired timings, with fast upshift and downshift. The configuration according to paragraph (13) provides a developing bias in which a DC voltage is superposed with three-value outputs of high-speed upshift and downshift.

Also the configuration according to paragraph (8) drives the switching elements at a constant current and in an unsaturated state.

Another object of the present invention is to provide a developing bias supplying circuit, providing three-value AC bias voltages capable of improving the developing performance of the image forming apparatus.

The above-mentioned object can be attained, according to an embodiment of the present invention, by a developing bias supplying circuit, for supply to a developing unit for developing a latent image formed on a photosensitive member in the image forming apparatus. The developing bias supplying circuit includes a positive high-voltage source; a negative high-voltage source; first and second high-voltage switch circuits for connecting the positive or negative high-voltage source to an output terminal for supply to the developing unit; a discharge resistor connected between the output terminal and the ground for dissipating the charge in a load capacitance; an output detection circuit for detecting the output; and a timing control circuit for selective on/off control of the first and second high-voltage switch circuits according to the detection signal from the output detection circuit and a predetermined timing signal.

In the above-mentioned configuration, the timing control circuit selectively turns on and off the first and second high-voltage switch circuits according to the detection signal from the output detection circuit and the predetermined timing signal, and the charge in the load capacitance is discharged by the discharge resistor connected between the output terminal and the ground, whereby the first and second high-voltage switch circuits alternately connect the positive and negative high-voltage sources to the output terminal, with the ground level between the positive and negative high-voltage sources, thereby supplying the developing unit with three-value AC bias voltages.

In order to realize three-value developing bias voltages with high-speed upshift and downshift, according to the present invention, first and second high-voltage switches are serially connected between the positive and negative high-voltage sources, and the turn-on timings of the two switches are controlled respectively by a control device. Also, the following configurations are adopted for resolving the drawbacks in the prior art, thereby providing more effective three-value developing bias voltages:

(1) An output detection circuit is provided, and the charging of the load capacitance by the high-voltage switch is terminated upon detection that the output has reached the intermediate value;

(2) Between the base and emitter of the high-voltage transistors employed in the first and second high-voltage switch circuits, there is added a switch for shortcircuiting the base and emitter with a low impedance, when the high-voltage transistor is shut off.

Still other objects of the present invention, and the features thereof, will become fully apparent from the following detailed description, to be taken in conjunction with the attached drawings.

DESCRIPTION OF THE PREFERRED EMBODIMENTS

Now the present invention will be explained in detail by preferred embodiments thereof.

[Embodiment 1]

Figure 1:
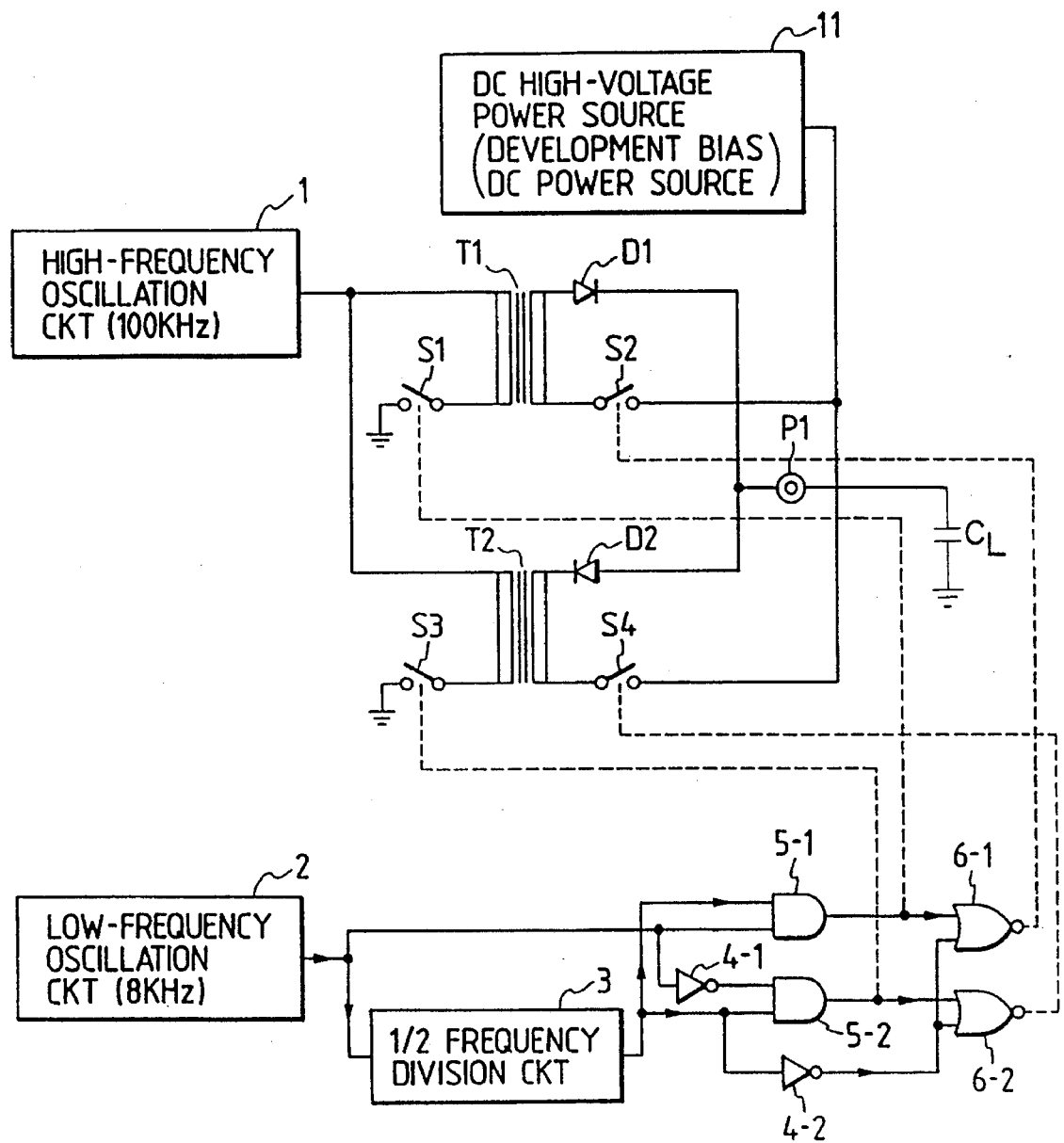
FIG. 1 is a block diagram of an embodiment 1.
Figure 2:
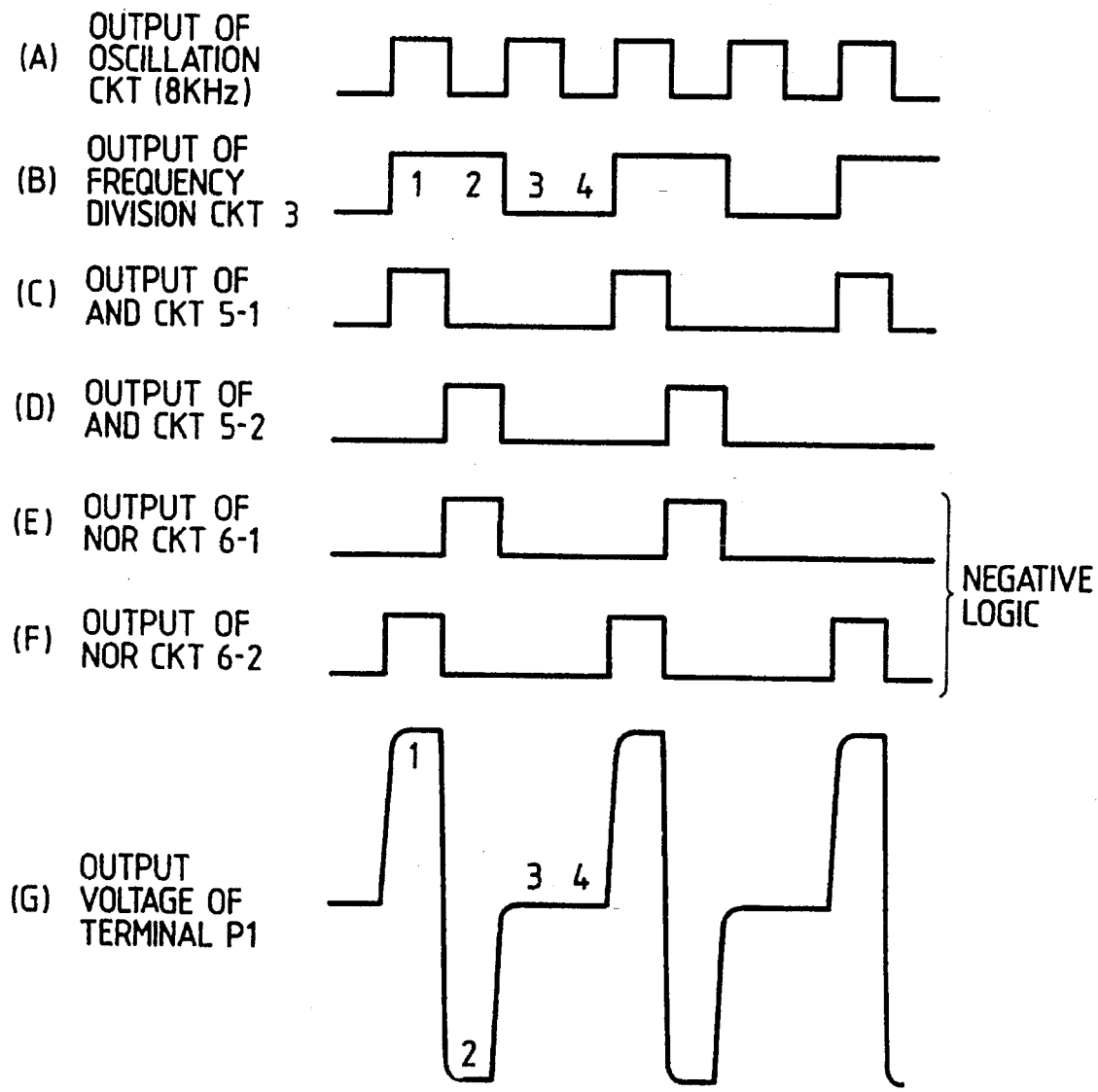
FIG. 2 is a wave form chart of various outputs in said embodiment 1.
Figure 3:
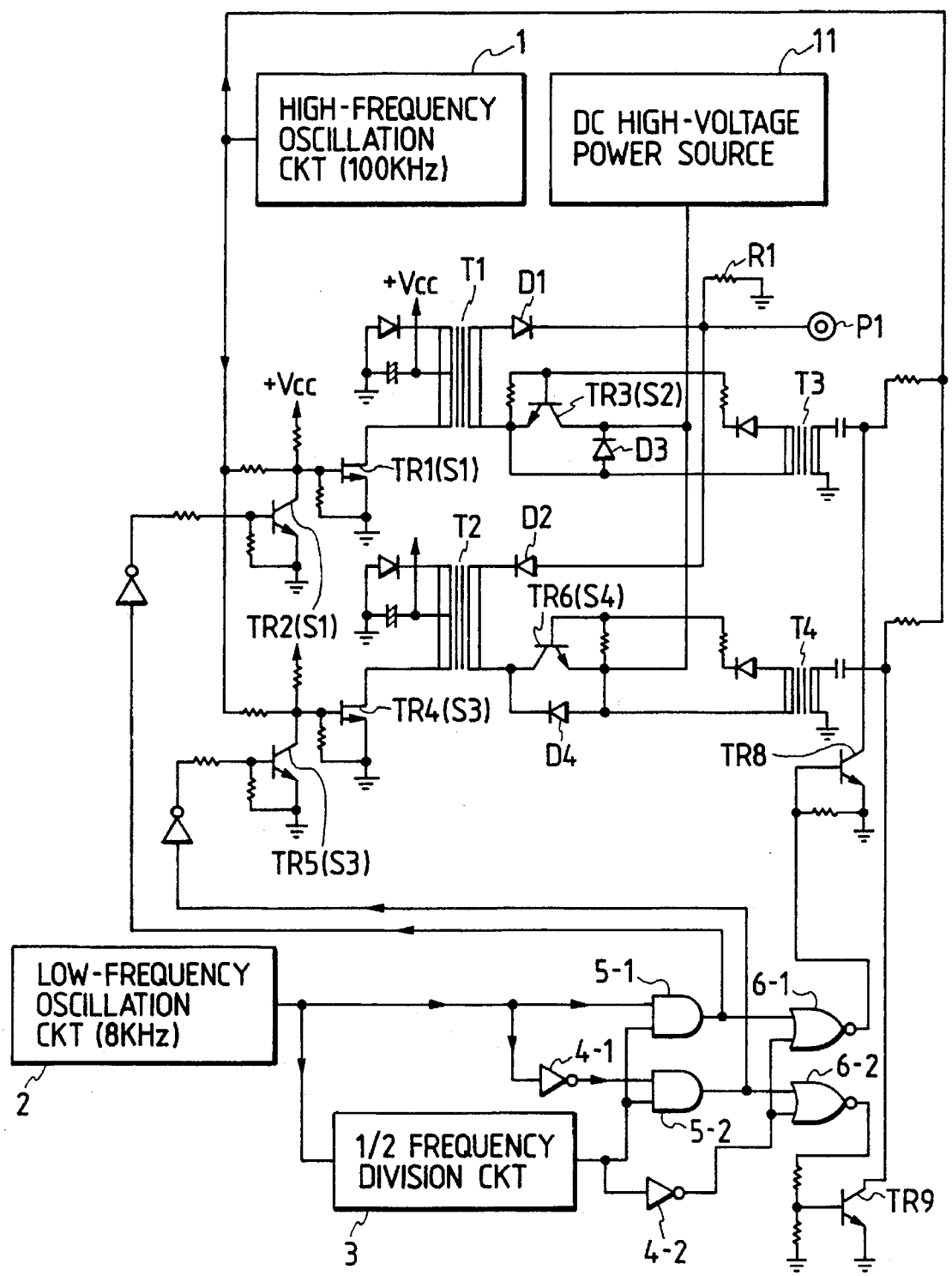
FIG. 3 is a detailed circuit diagram of the embodiment 1.

FIG. 1 is a block diagram of a developing bias source for a copying machine, constituting an embodiment 1. FIG. 2 is a waveform chart showing output signals of various parts in FIG. 1, and FIG. 3 is a detailed circuit diagram corresponding to FIG. 1.

Referring to FIG. 1, an oscillator circuit 1 generates a high frequency signal (about 50 to 200 KHz; 100 KHz in the present embodiment), for supply to the primary sides of converter transformers T1, T2, of which secondary outputs are respectively rectified by diodes D1, D2 and are connected, in parallel, to an output terminal P1.

Electronic switches S1–S4 are respectively controlled by the outputs of an AND gate 5-1, a NOR gate 6-1, an AND gate 5-2 and a NOR gate 6-2.

There are also provided an oscillator circuit 2 of a low frequency (about 2–10 KHz; 8 KHz in the present embodiment); a ½ frequency dividing circuit 3; inverters 4-1, 4-2; AND gates 5-1, 5-2; and NOR gates 6-1, 6-2.

In the illustrated circuits, the AND gates 5-1, 5-2 provide positive pulses of a duty ratio of ¼, with a mutual phase difference of ¼ cycles as respectively shown by (C) and (D) in FIG. 2, and the NOR gates 6-1, 6-2 provide outputs as shown by (E) and (F) in FIG. 2.

Thus, in the timings (1) to (4) of a quarter each of a cycle of the output of the ½ frequency division circuit 3, as shown in (B) in FIG. 2, the electronic switches S1–S4 function in the following manner.

In the first timing (1), the switches S1, S2 are turned on while S3, S4 are turned off. In the second timing (2), the switches S1, S2 are turned off while S3, S4 are turned on. In the third and fourth timings (3), (4), the switches S1, S3 are turned off while S2, S4 are turned on. The NOR gates 6-1, 6-2 adopt the negative logic because of the circuit configuration.

The output terminal P1, being connected to a developing sleeve in the developing unit, functions in the following manner.

When the electronic switches S1, S2 are turned on, the positive-output converter is activated to charge the load capacitance (spatial capacitance between the developing sleeve and a photosensitive drum) connected to the output terminal P1 in a positive direction. When the electronic switches S3, S4 are turned on, the negative-output converter is activated to charge said load capacitance in a negative direction. When the electronic switches S1, S3 are turned off while the switches S2, S4 are turned on, the outputs of the converters of positive and negative outputs become both zero, and the output terminal P1 is connected to the output of the DC high voltage source 11. Thus there are obtained three-value bias voltages as shown by (G) in FIG. 2.

Referring to FIG. 3, FET's TR1, TR4 for respectively driving the primary sides of the converter transformers T1, T2 correspond to the electronic switches S1, S3, and transistors TR2, TR5 connected to the gates of said FET's TR1, TR4 shortcircuit the gates of said FET's to the ground, thereby shutting off the driving inputs to said converter transformers T1, T2.

High-voltage transistors TR3, TR6 respectively correspond to the electronic switches S2, S4. Diodes D3, D4 are provided for protecting the transistors TR3, TR6 from inverse voltages. The bases of said transistors TR3, TR6 are driven in a state insulated from the ground by pulse transformers T3, T4. The primary sides of said transformers receive the output of the high-frequency oscillator circuit 1 (100 KHz) through coupling capacitors and resistors. The collector of the transistor TR3 and the emitter of the transistor TR6 are directly connected to the output of the DC high-voltage source 11.

When the oscillation output is supplied to the primary sides of the pulse transformers T3, T4, high frequency voltages are induced in the secondary Sides to supply base currents to the transistors TR3, TR6, thereby rendering the collector-emitter paths thereof conductive.

In the first timing (1), the AND gate 5-1 provides a high-level output signal while the NOR gate 6-1 provides a low-level output signal to turn off the transistors TR2, TR8 thereby turning on the FET TR1. Thus the converter transformer T1 is driven by the high frequency output of 100 KHz from the oscillator circuit 1, and the transistor TR3 is rendered conductive, thereby charging the load capacitance connected to the output terminal P1 in the positive direction.

In the second timing (2), the AND gate 5-1 provides a low-level output signal while the NOR gate 6-1 provides a high-level output signal to turn on the transistors TR2, TR8 thereby shutting off the high frequency driving pulses to the primary sides of the transformers T1, T3. Thus the transistor TR3 is turned off, whereby the diode D1 is not rendered conductive even if the output terminal P1 assumes a negative potential by the function of the converter transformer T2. Also in this second timing, the AND gate 5-2 provides a high-level output signal while the NOR gate 6-2 provides a low-level output signal to activate the converter transformer T2 and to turn on the transistor TR6, whereby the load capacitance is charged in the negative direction.

In the third and fourth timings (3), (4), the primary sides of the converter transformers T1, T2 are shut off, and the primary sides of the pulse transformers T3, T4 are activated as the transistors TR8, TR9 are turned off. As the transistors TR3, TR6 are both turned on, the potential of the output terminal P1 rapidly converges to the output voltage of the DC high voltage source 11.

In the present embodiment, as explained in the foregoing, the high frequency-driven converters are switched by high-speed switches to obtain three-value output voltages with rapid upshift and downshift as shown by (G) in FIG. 2. Also this developing bias source for the copying machine provides a hard copy with a high density, a high resolving power and reduced background smudge.

[Embodiment 2]

Figure 4:
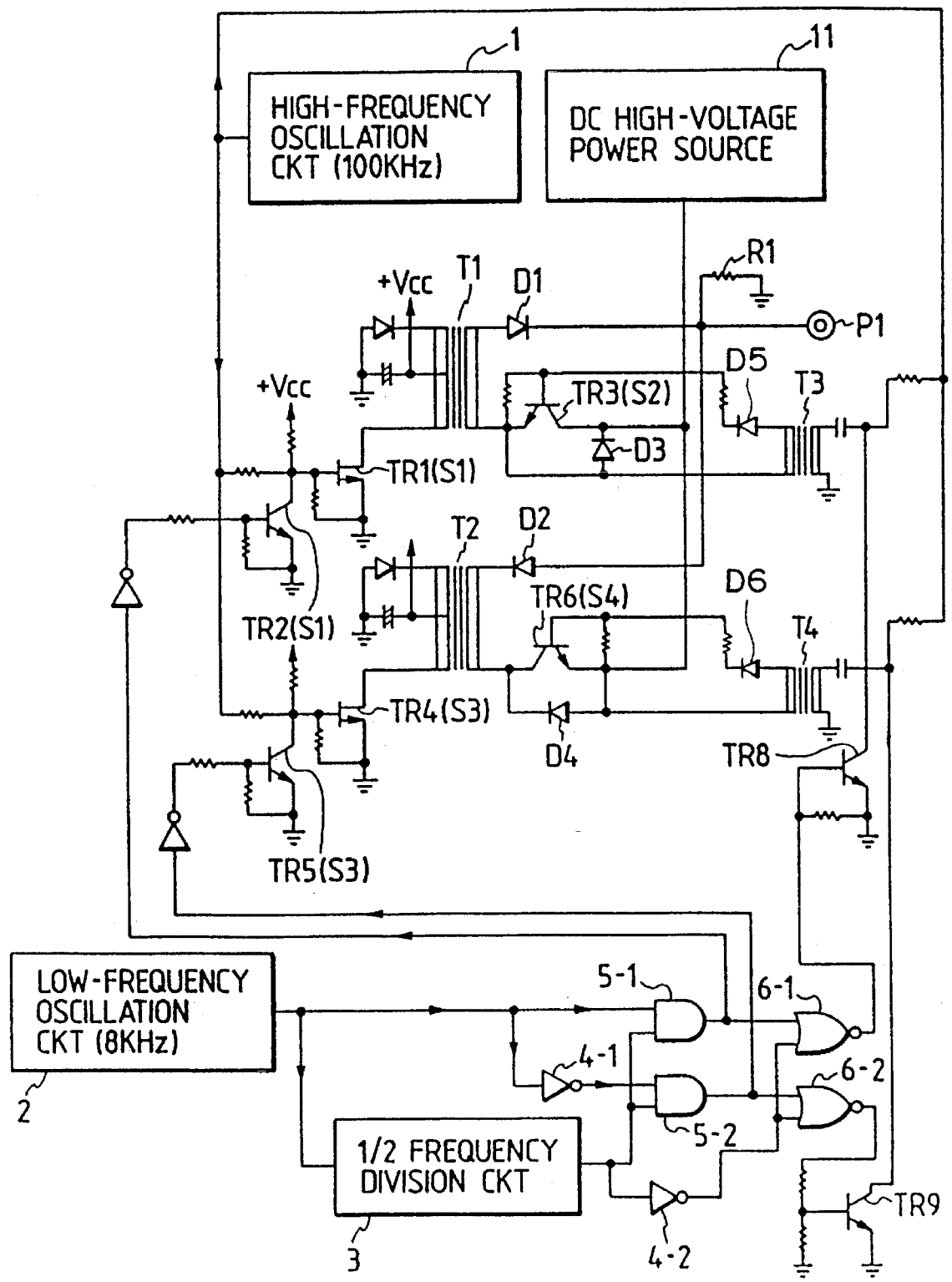
FIG. 4 is a detailed circuit diagram of an embodiment 2.

FIG. 4 is a circuit diagram of an embodiment 2, in which diodes D3, D4, D5 and D6 are placed at the secondary sides of the pulse transformers T3, T4, in order to improve the switching speed of the high voltage transistors TR3, TR6. The direct connection of the secondary coils to the bases and emitters of the transistors TR3, TR6 to apply an inverse bias voltage to said bases for extracting the accumulated charges, whereby the shut-off characteristics of said transistors TR3, TR6 can be significantly improved.

[Embodiment 3]

Figure 5:
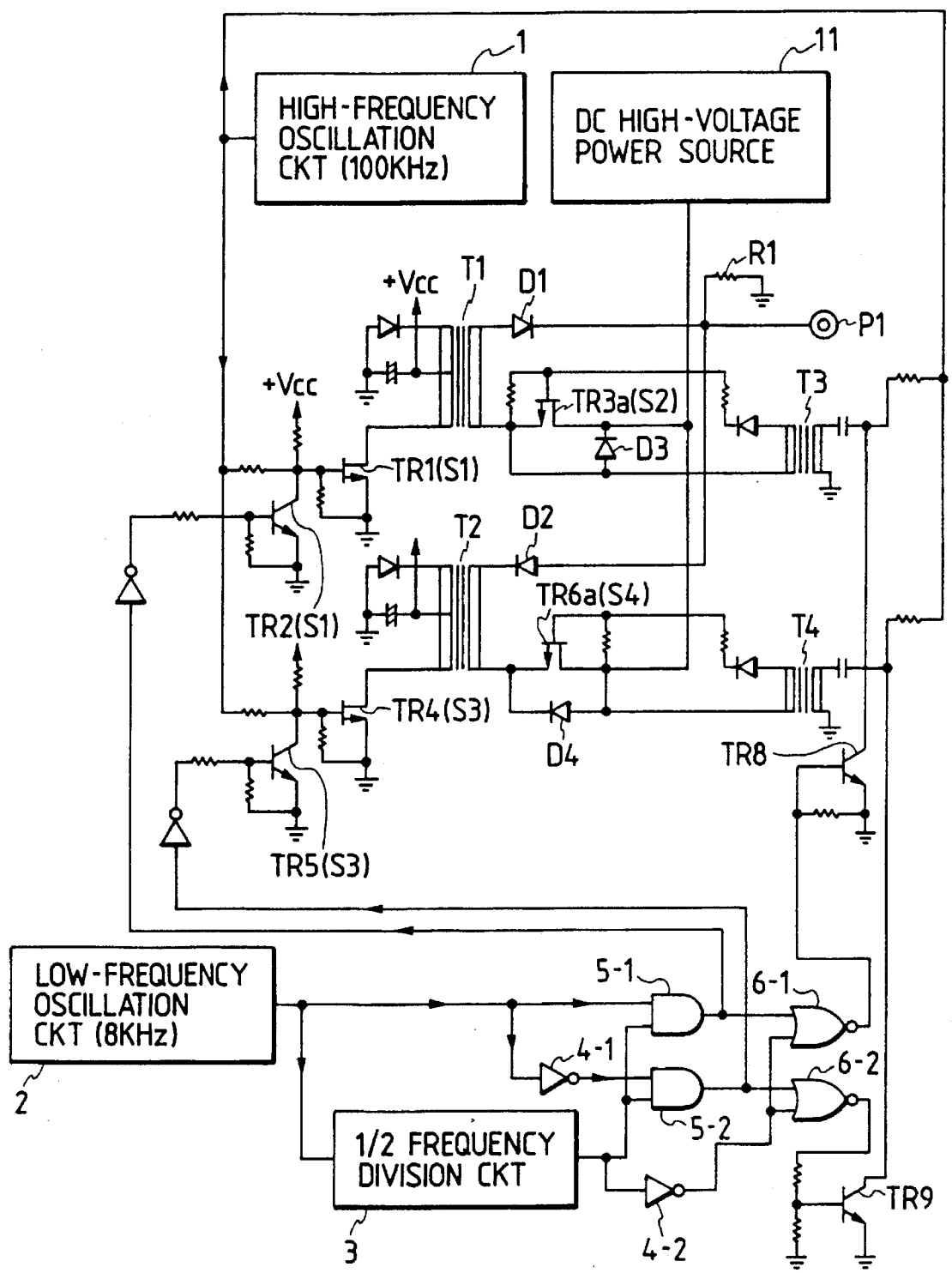
FIG. 5 is a detailed circuit diagram of an embodiment 3.

FIG. 5 is a circuit diagram of an embodiment 3, in which high-voltage FET's TR3a, TR6a are employed, instead of the high-voltage transistors, as the electronic switches S2, S4 at the secondary sides of the converter transformers T1, T2.

[Embodiment 4]

Figure 6:
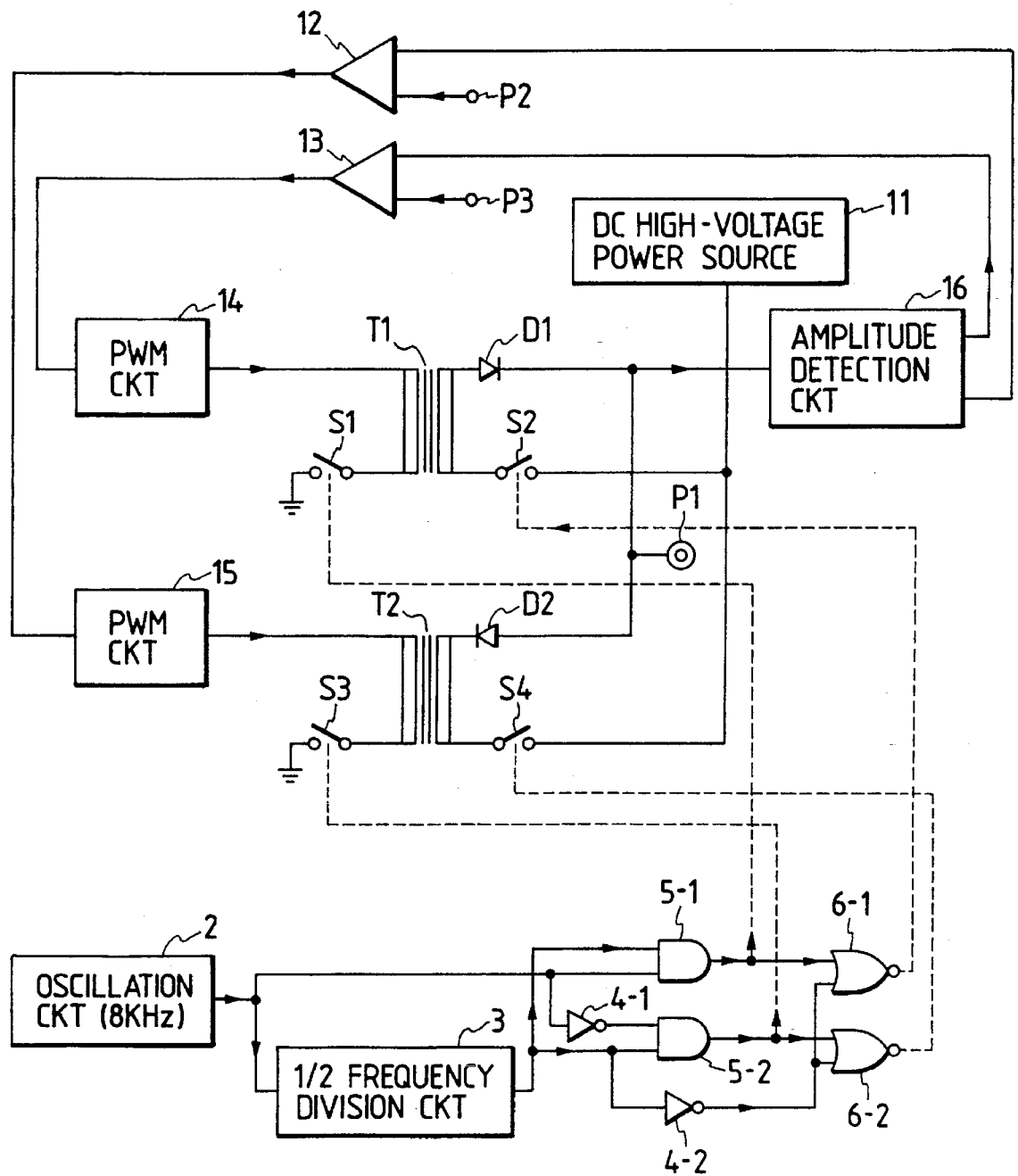
FIG. 6 is a block diagram of an embodiment 4.
Figure 7:
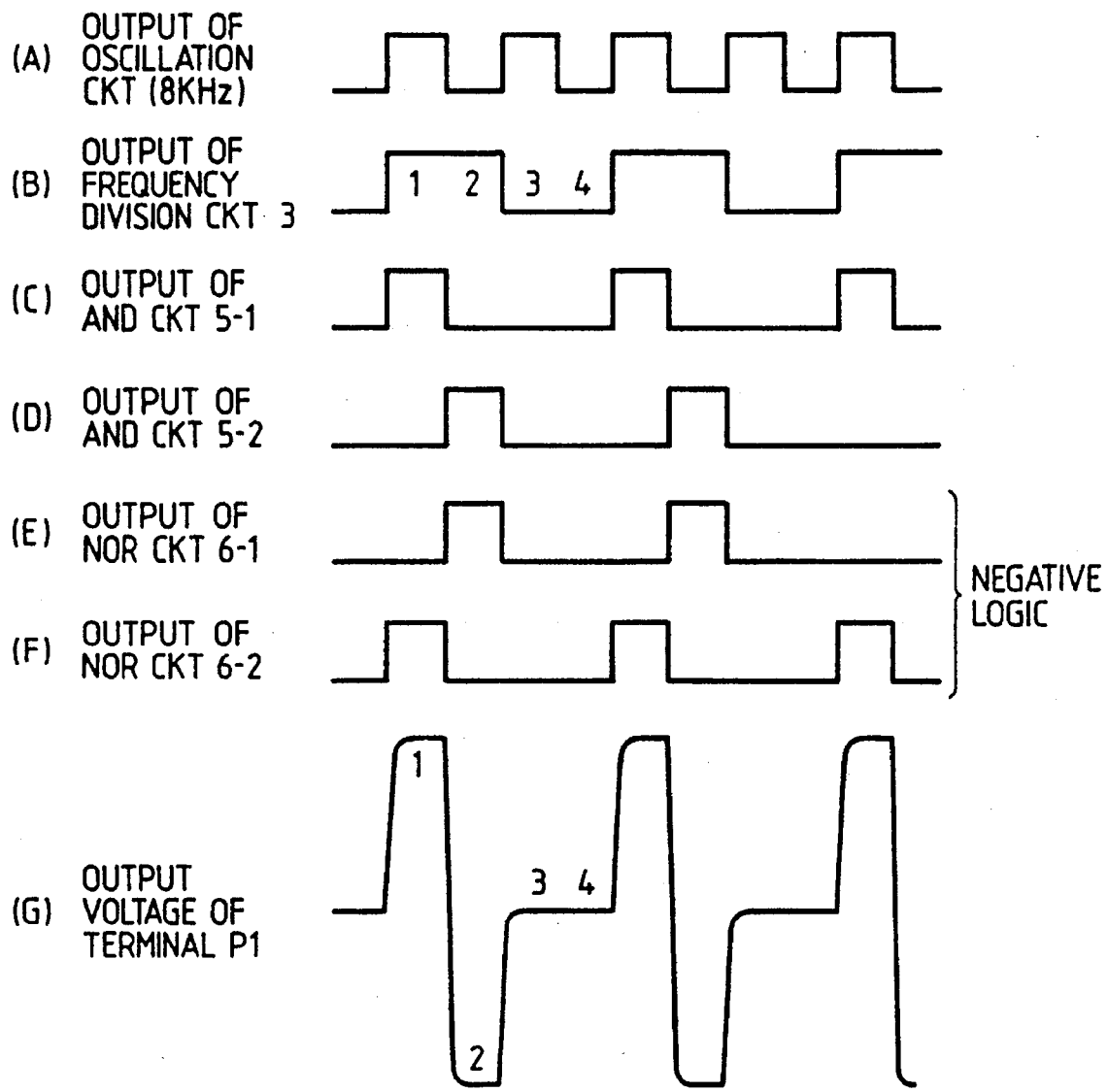
FIG. 7 is a wave form chart of various outputs in said embodiment 4.
Figure 8:
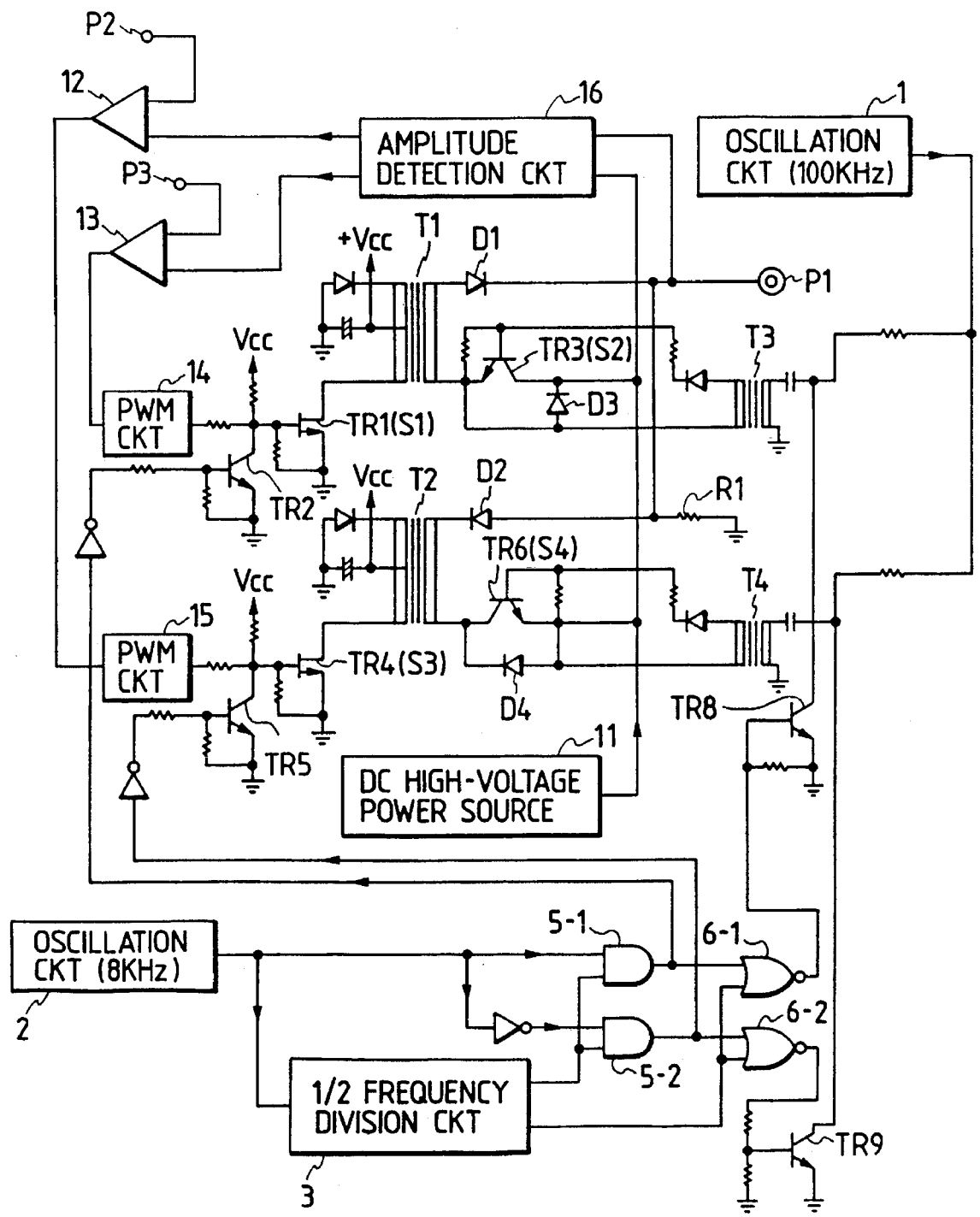
FIG. 8 is a detailed circuit diagram of the embodiment 4.

FIG. 6 is a block diagram of a developing bias source for the copying machine, constituting an embodiment 4. FIG. 7 is a wave form chart showing signals in various parts in FIG. 6, and FIG. 8 is a detailed circuit diagram corresponding to FIG. 6.

Referring to FIG. 6, error amplifiers 12, 13 control PWM circuits 14, 15 by respectively comparing the positive and negative amplitude levels, detected by an amplitude detection circuit 16, with reference values supplied to terminals P2, P3. The primary sides of the converter transformers T1, T2 are subjected to the control of current supply, by switching FET's TR1, TR4, driven by said PWM circuits 14, 15. The secondary outputs of said converter transformers T1, T2 are respectively rectified by diodes D1, D2 and are connected, in parallel, to the output terminal P1.

Electronic switches S1–S4 are respectively controlled by the outputs of an AND gate 5-1, a NOR gate 6-1, an AND gate 5-2 and a NOR gate 6-2.

There are also provided an oscillator circuit 2 of a low frequency (about 2–10 KHz; 8 KHz in the present embodiment); a ½ frequency dividing circuit 3; inverters 4-1, 4-2; AND gates 5-1, 5-2; and NOR gates 6-1, 6-2.

In the illustrated circuits, the AND gates 5-1, 5-2 provide positive pulses of a duty ratio of ¼, with a mutual phase difference of ¼ cycles as respectively shown by (C) and (D) in FIG. 7, and the NOR gates 6-1, 6-2 provide outputs as shown by (E) and (F) in FIG. 7.

Thus, in the timings (1) to (4) of a quarter each of a cycle of the output of the ½ frequency division circuit 2, as shown by (B) in FIG. 7, the electronic switches S1–S4 function in the following manner.

In the first timing (1), the switches S1, S2 are turned on while S3, S4 are turned off. In the second timing (2), the switches S1, S2 are turned off while S3, S4 are turned on. In the third and fourth timings (3), (4), the switches S1, S3 are turned off while S2, S4 are turned on. The NOR gates 6-1, 6-2 adopt the negative logic because of the circuit configuration.

The output terminal P1, being connected to a developing sleeve in the developing unit, functions in the following manner.

When the electronic switches S1, S2 are turned on, the positive-output converter is activated to charge the load capacitance (spatial capacitance between the developing sleeve and a photosensitive drum) connected to the output terminal P1 in a positive direction. When the electronic switches S3, S4 are turned on, the negative-output converter is activated to charge said load capacitance in a negative direction. When the electronic switches S1, S3 are turned off while the switches S2, S4 are turned on, the outputs of the converters of positive and negative outputs become both zero, and the output terminal P1 is connected to the output of the DC high voltage source 11. Thus there are obtained three-value bias voltages as shown by (G) in FIG. 7.

Referring to FIG. 8, FET's TR1, TR4 for respectively driving the primary sides of the converter transformers T1, T2 correspond to the electronic switches S1, S3 shown in FIG. 6, and transistors TR2, TR5 connected to the gates of said FET's TR1, TR4 shortcircuit the gates of said FET's to the ground, thereby shutting off the driving inputs to said converter transformers T1, T2.

High-voltage transistors TR3, TR6 respectively correspond to the electronic switches S2, S4. Diodes D3, D4 are provided for protecting the transistors TR3, TR6 from inverse voltages. The bases of said transistors TR3, TR6 are driven in a state insulated from the ground by pulse transformers T3, T4. The primary sides of said transformers receive the output of the high-frequency oscillator circuit 1 (100 KHz) through coupling capacitors and resistors. The collector of the transistor TR3 and the emitter of the transistor TR6 are directly connected to the output of the DC high-voltage source 11.

When the oscillation output is supplied to the primary sides of the pulse transformers T3, T4, high frequency voltages are induced in the secondary sides to supply base currents to the transistors TR3, TR6, thereby rendering the collector-emitter paths thereof conductive.

In the first timing (1), the AND gate 5-1 provides a high-level output signal while the NOR gate 6-1 provides a low-level output signal to turn off the transistors TR2, TR8 thereby turning on the FET TR1. Thus the converter transformer T1 is driven by the high frequency output of 100 KHz from the oscillator circuit 1, and the transistor TR3 is rendered conductive, thereby charging the load capacitance connected to the output terminal P1 in the positive direction.

In the second timing (2), the AND gate 5-1 provides a low-level output signal while the NOR gate 6-1 provides a high-level output signal to turn on the transistors TR2, TR8 thereby shutting off the high frequency driving pulses to the primary sides of the transformers T1, T3. Thus the transistor TR3 is turned off, whereby the diode D1 is not rendered conductive even if the output terminal P1 assumes a negative potential by the function of the converter transformer T2. Also in this second timing, the AND gate 5-2 provides a high-level output signal while the NOR gate 6-2 provides a low-level output signal to activate the converter transformer T2 and to turn on the transistor TR6, whereby the load capacitance is charged in the negative direction.

In the third and fourth timings (3), (4), the primary sides of the converter transformers T1, T2 are shut off, and the primary sides of the pulse transformers T3, T4 are activated as the transistors TR8, TR9 are turned off. As the transistors TR3, TR6 are both turned on, the potential of the output terminal P1 rapidly converges to the output voltage of the DC high voltage source 11.

Figure 9:
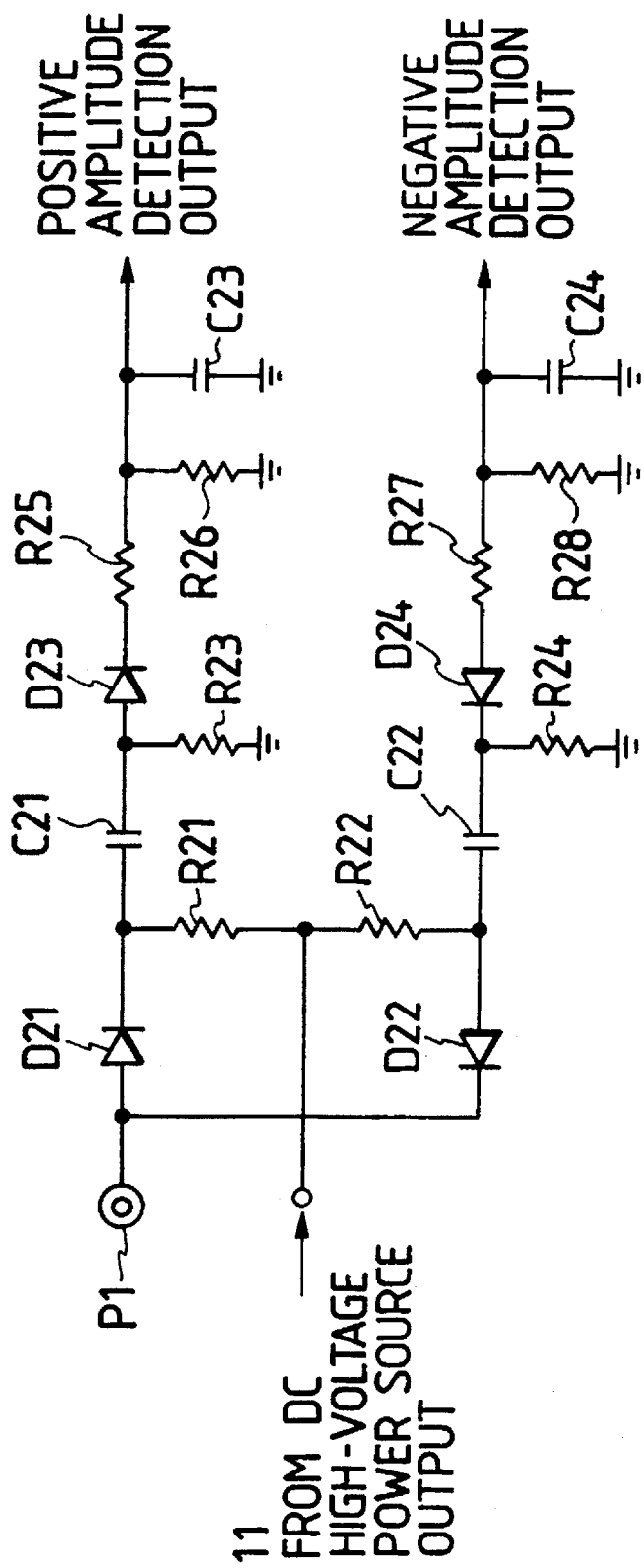
FIG. 9 is a circuit diagram of an amplitude detection circuit 16.

The positive and negative amplitudes of the output are separately detected by the amplitude detection circuit 16, of which an example of circuit structure is shown in FIG. 9. The output of the terminal P1 is separated by diodes D21, D22 into positive and negative components, which are respectively transmitted by capacitors C21, C22, and are rectified and smoothed by succeeding circuits starting from diodes D23, D24. The signals separated and detected in this amplitude detection circuit 16 are respectively compared with reference voltages in the error amplifiers 12, 13, thereby determining the output pulse durations of the PWM circuits 14, 15.

As explained in the foregoing, the present embodiment can provide, at the output terminal P1, three-value voltages of desired values, with fast upshift and downshift. Also this developing bias source for the copying machine can provide a hard copy of a high density, a high resolving power and reduced background smudge.

[Embodiment 5]

Figure 10:
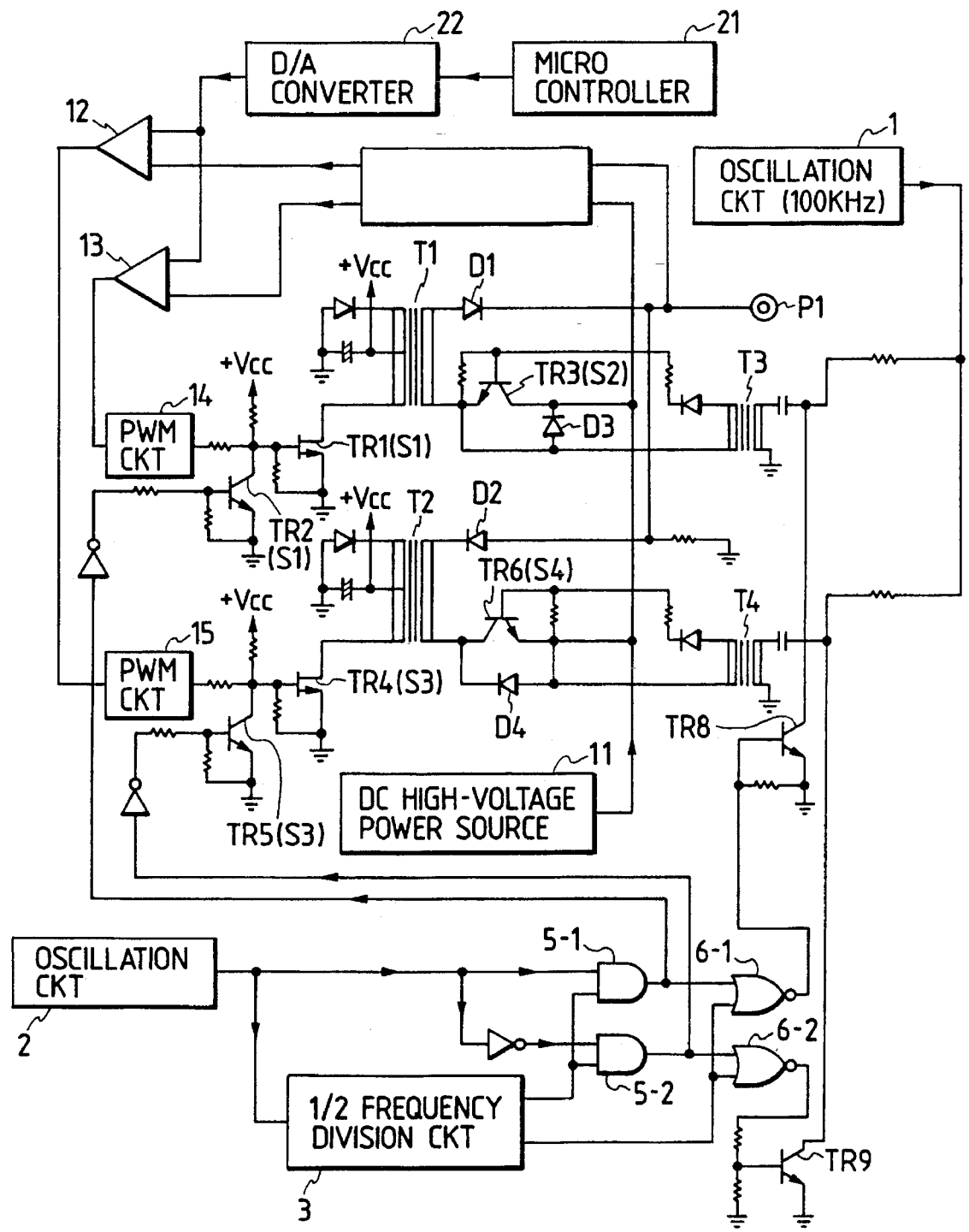
FIG. 10 is a detailed circuit diagram of an embodiment 5.

FIG. 10 is a detailed circuit diagram of an embodiment 5, in which the reference voltages for the error amplifiers 12, 13 in the embodiment 4 are program controlled. More specifically, the reference voltages are generated by a program in a microcontroller 21, and, after conversion into analog signals by a D/A converter 22, supplied to the error amplifiers 12, 13. It is therefore rendered possible to arbitrarily vary the output amplitude by said programming, and to delicately control the upshift and downshift of the output.

[Embodiment 6]

Figure 11:
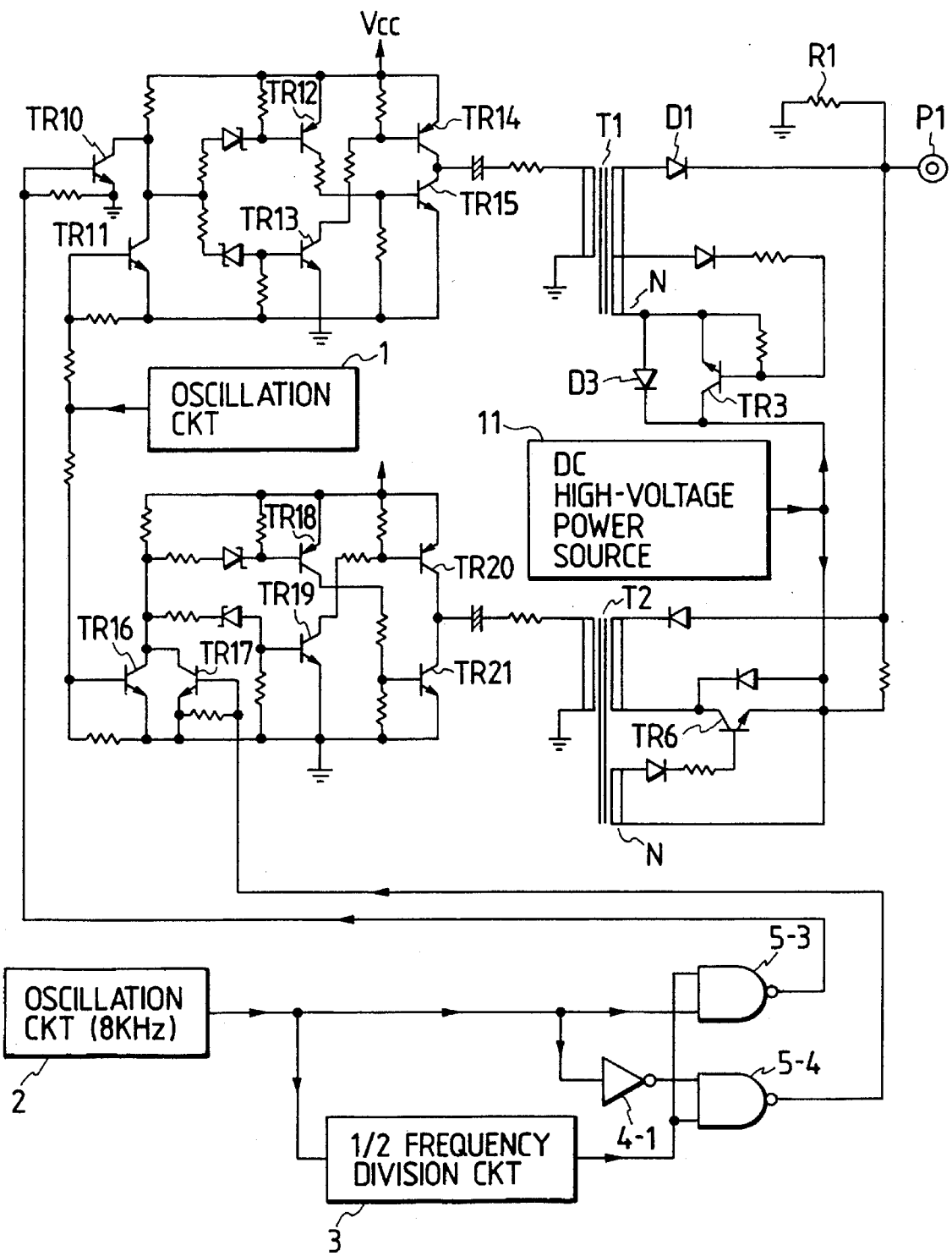
FIG. 11 is a detailed circuit diagram of an embodiment 6.

FIG. 11 is a detailed circuit diagram of an embodiment 6, in which the control circuit is simplified. Firstly, the control voltages for the electronic switches in the secondary sides of the converter transformers T1, T2 are not obtained by the pulse transformers but from the secondary coils of the converter transformers T1, T2. There are provided secondary coils N for driving the bases of the transistors TR3, TR6, and the output voltages of said coils N are applied, after rectification, between the base and the emitter, whereby the transistors TR3, TR6 are rendered conductive during the function of the converters. Also in order to stabilize the output amplitudes without the feedback control, the primary sides of the converter transformers are switched to the ground side or to the power source side by means of complementary switches.

Detailed function of this embodiment is as follows.

In the first timing, a NAND gate 5-3 provides a low-level output signal to turn off a transistor TR10, whereby the high frequency signal from the oscillator circuit 1 is supplied to the converter transformer T1, but a NAND gate 5-4 provides a high-level output signal to turn on a transistor TR17, whereby the high frequency signal from the oscillator circuit 1 is shut off and not supplied to the converter transformer T2.

In relation to the converter transformer T1, a transistor TR11 is turned on and off by the output of the oscillator circuit 1, thereby alternately turning on transistors TR12, TR15 and transistors TR13, TR14, whereby the converter transformer T1 is driven with a high frequency. On the other hand, in relation to the converter transformer T2, a transistor TR17 is turned on to turn on transistors TR18, TR21, thereby grounding or shortcircuiting the primary side of the converter transformer T2. As a result, the output terminal P1 is given the DC voltage of the DC high voltage source 11, superposed with the positive output voltage of the converter transformer T1.

In the second timing, the NAND gate 5-3 provides a high-level output signal while the NAND gate 5-4 provides a low-level output signal, whereby the converter transformer T2 is driven with a high frequency. Thus the output terminal P1 receives the DC voltage of the DC high voltage source 11, superposed with the negative output voltage of the converter transformer T2.

In the third and fourth timings, the NAND gates 5-3, 5-4 provide high-level output signals, whereby the converter transformers T1, T2 are not driven, so that the output terminal P1 provides the ground potential by a resistor R1 connected thereto.

In this manner there can be obtained three-value output voltages of desired values, with fast upshift and downshift.

[Embodiment 7]

Figure 12:
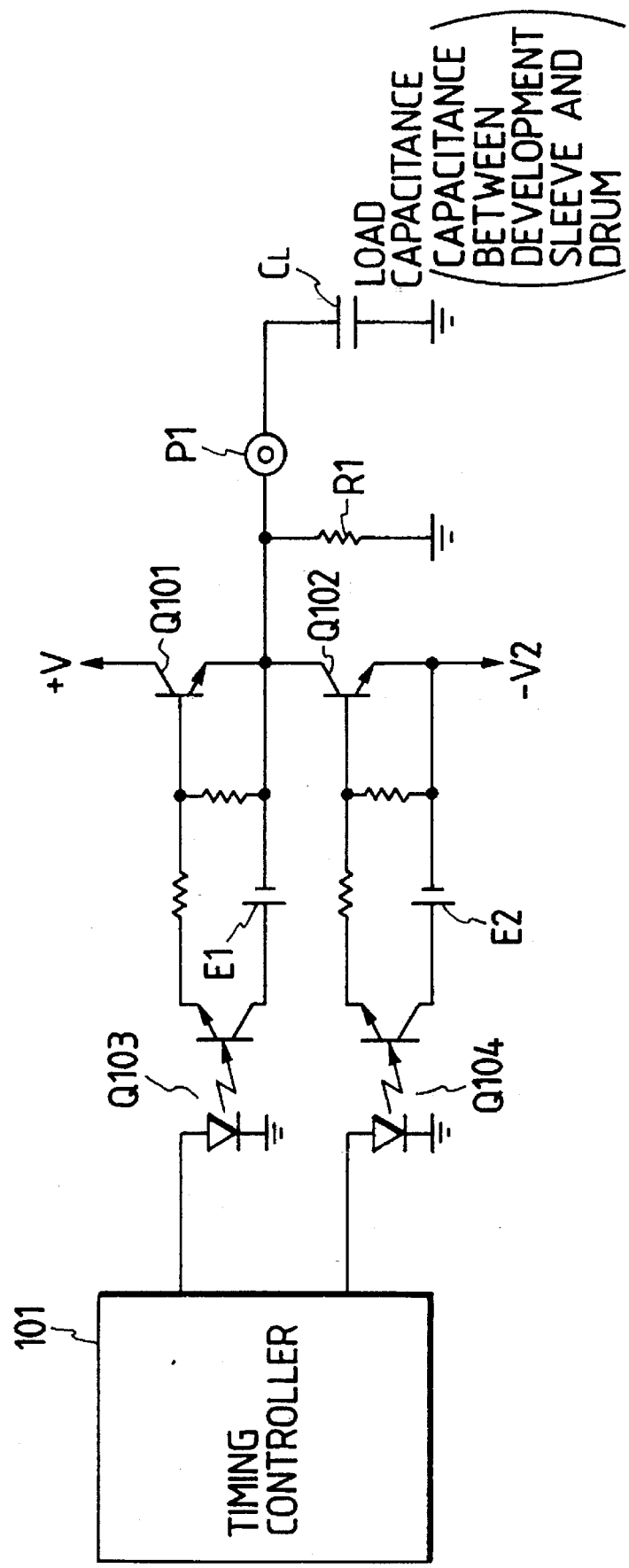
FIG. 12 is a circuit diagram of an embodiment 7.

FIG. 12 is a circuit diagram of an embodiment 7, wherein high-voltage transistors Q101, Q102 are mutually connected serially and are inserted between positive and negative DC high-voltage sources +V1 and −V2. A voltage generated at the junction point between said transistors Q101, Q102 is supplied, as the developing AC bias, to the developing sleeve of the developing unit. Between the output terminal and the ground, there is connected a discharge resistor R1 for discharging the capacitance between the developing sleeve and the photosensitive drum. The base currents of said transistors Q101, Q102 are controlled, respectively through photocouplers Q103, Q104, by a timing controller 101. There are provided floating power sources E1, E2, for supplying base currents.

Figure 13:
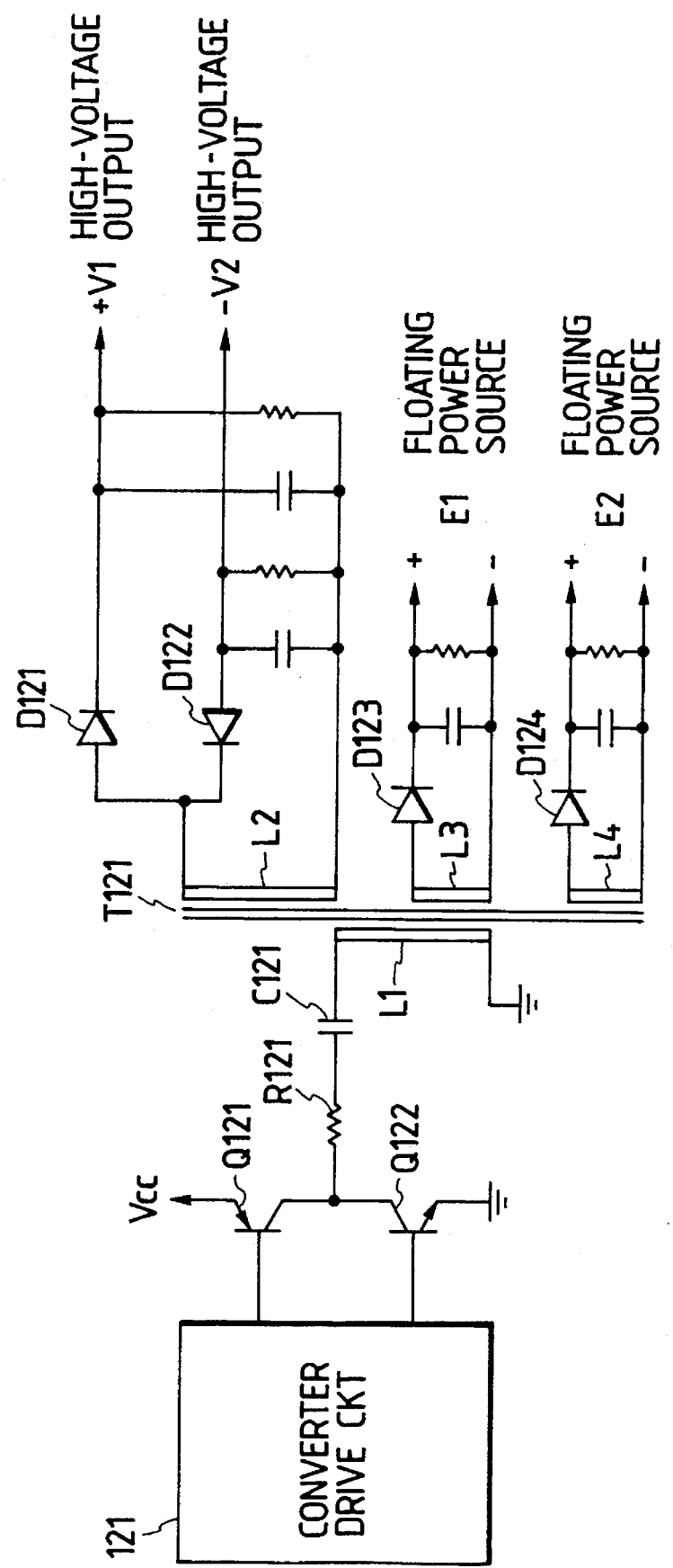
FIG. 13 is a circuit diagram of a power supply unit in the embodiment 7.

FIG. 13 is a detailed circuit diagram of the high voltage sources V1, V2 and floating power sources E1, E2. A converter transformer T121 is provided, at the secondary side, with a high voltage coil L2 and low voltage coils L3, L4. The output of said high voltage coil L2 is rectified by high voltage diodes D121, D122 to respectively provide voltages +V1 (+1 kV) and −V2 (−1 kV). The outputs of the low voltage coils L2, L3 are respectively rectified by diodes D123, D124 to provide outputs in a range of about 3 to 10 V.

The primary side of the converter transformer T121 is driven by operating complementary switches Q121, Q122 by means of a driving circuit 121.

Figure 14:
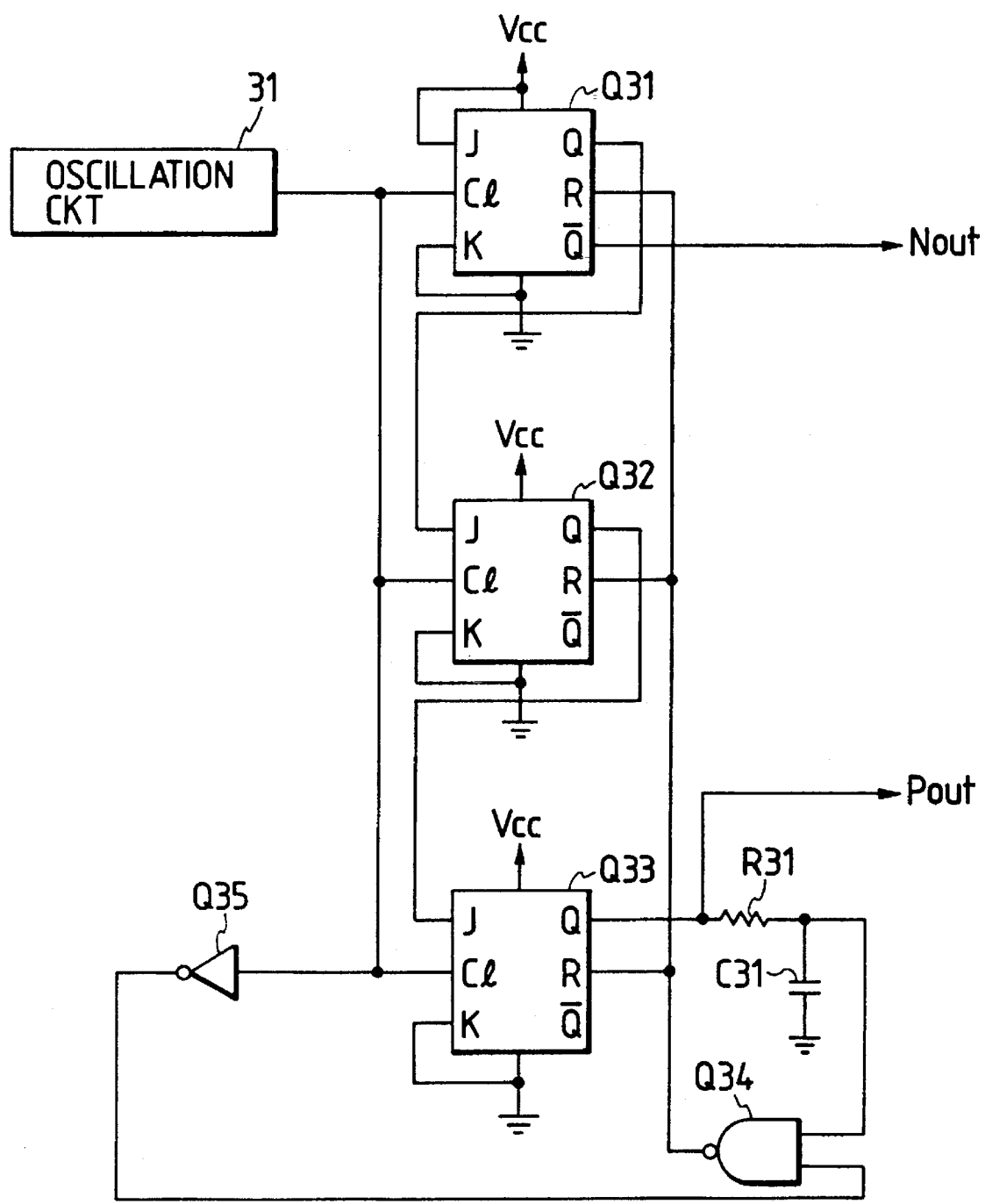
FIG. 14 is a circuit diagram of a timing controller in the embodiment 7.
Figure 15:
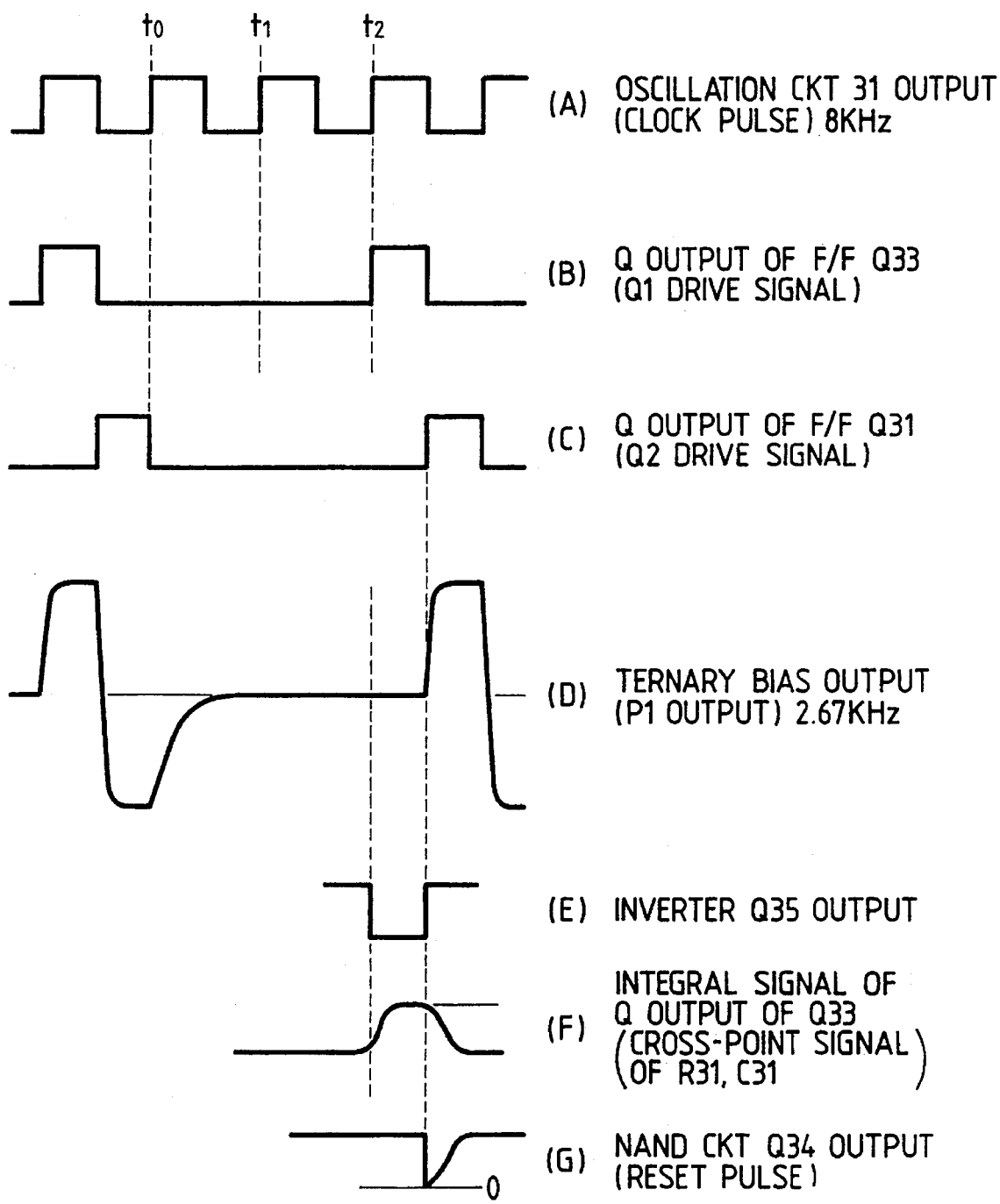
FIG. 15 is a timing chart of the timing controller in the embodiment 7.

FIG. 14 is a detailed circuit diagram of the timing controller 1 and FIG. 15 is a timing chart thereof. An oscillation circuit 31 generates clock pulses of a frequency of 8 KHz. Master-slave type flip-flops Q31–Q33 constitute a three-step ring converter, and Q-outputs of said flip-flops are shifted from the low level state to the high level state at timings t0, t1 and t2 shown in (A) in FIG. 15. A NAND gate Q34 receives the integrated Q output of the flip-flop Q33 and the inverted clock signal, and provides a reset pulse shown in (G). The positive-side switch Q103 is driven by the Q output of the flip-flop Q33, while the negative-side switch Q104 is driven by the inverted Q output of the flip-flop Q31, whereby three-value bias voltages as shown in (D) are obtained at the output terminal P1. The convergence to the ground level is achieved by the discharge resistor R1 inserted between the output terminal P1 and the ground. In this manner there can be obtained three-value output voltages of desired values, with fast upshift and downshift.

[Embodiment 8]

Figure 16:
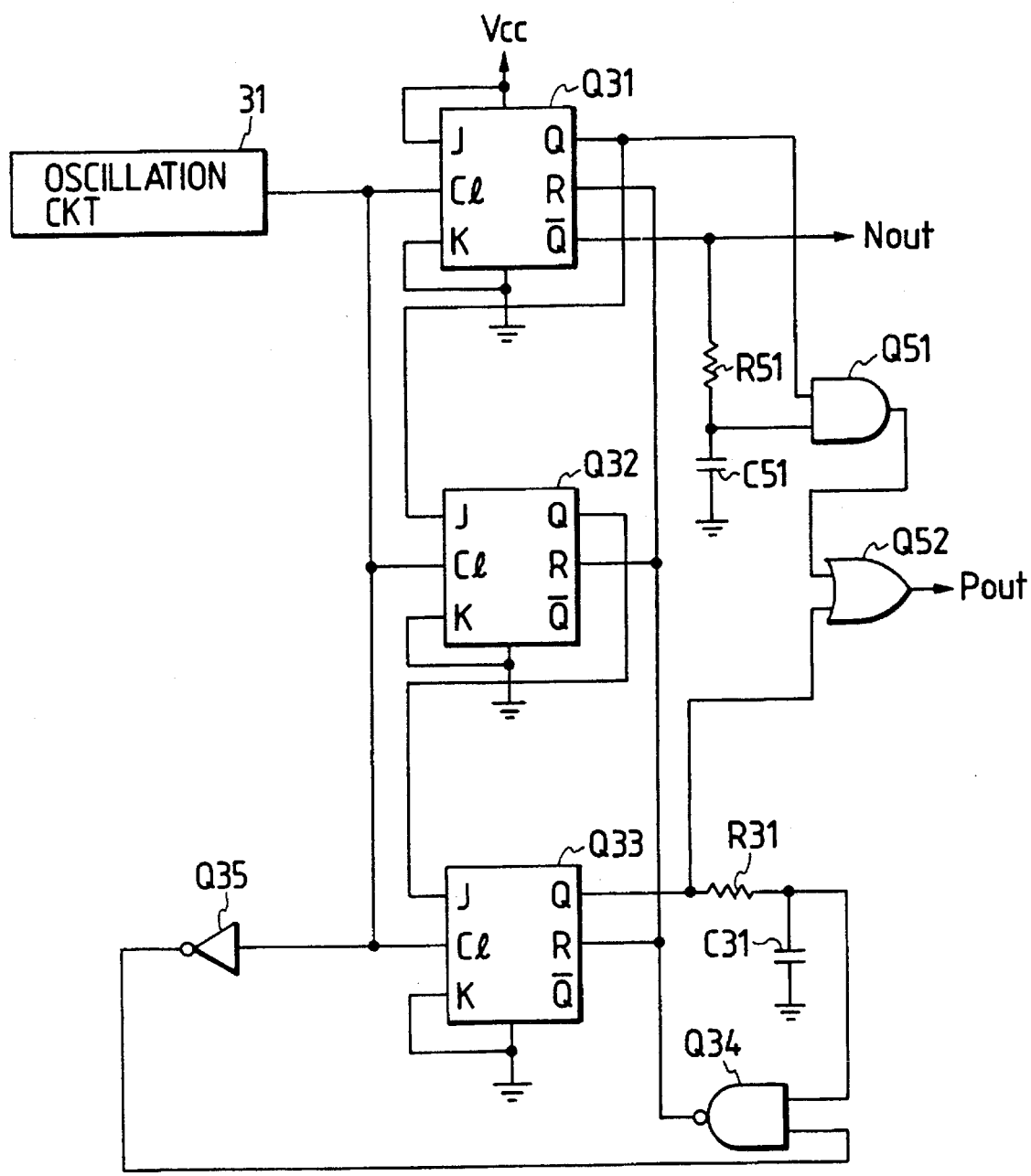
FIG. 16 is a circuit diagram of the timing controller in an embodiment 8.
Figure 17:
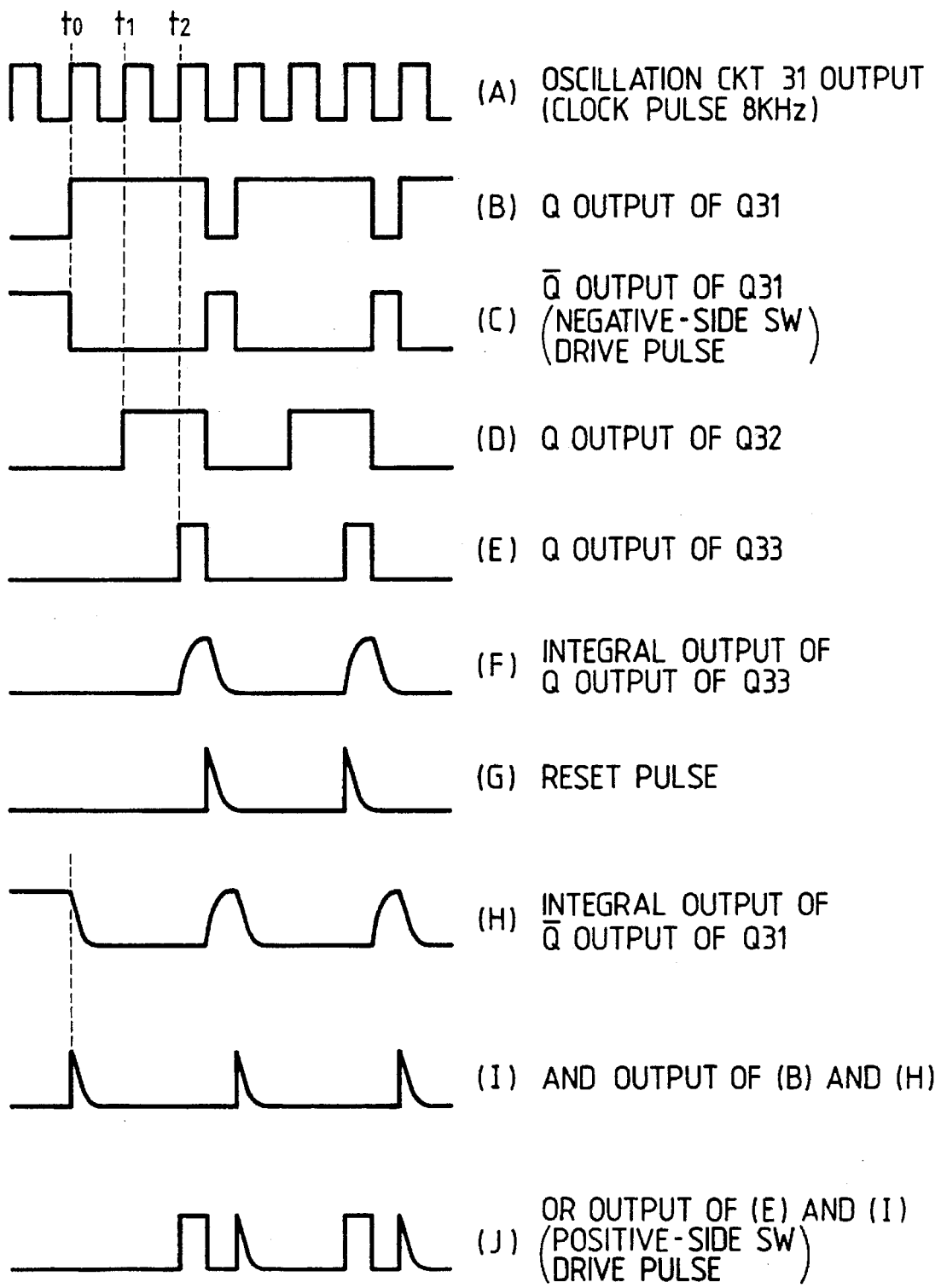
FIG. 17 is a timing chart of the timing controller in the embodiment 8.

FIG. 16 is a circuit diagram of a timing controller employed in an embodiment 8, and FIG. 17 is a timing chart thereof. The main circuit configuration is same as that in the embodiment 7, shown in FIG. 12. In said embodiment 7, in order to achieve fast convergence to the intermediate output level (ground level), the resistance of the discharging resistor R1 has to be lowered, with a significant power loss. Also there will result a temperature rise in the discharge resistor itself, and a dimensional increase in the switching elements and in the switching circuit.

The present embodiment realizes faster convergence to the intermediate level without increasing the power loss in the resistor R1, by applying a pulse of predetermined duration to the positive-side switch Q103 at the switching from the voltage −V2 to the ground level, thereby activating said positive-side switch Q103 until immediately before said intermediate level is reached.

More specifically, the inverted Q output of the flip-flop Q31 is integrated by a capacitor C51 and a resistor R51 to obtain an integrated output shown by (H) in FIG. 17, and said integrated output and the Q output of the flip-flop Q31 are supplied to an AND gate 51, of which output is supplied, together with the Q output of the flip-flop Q33 to an OR gate Q52. Thus obtained signal is used for driving the positive-side switch Q103 to accelerate the convergence to the intermediate level. Also the convergence from +V1 to the intermediate level can also be accelerated in a similar manner.

[Embodiment 9]

Figure 18:
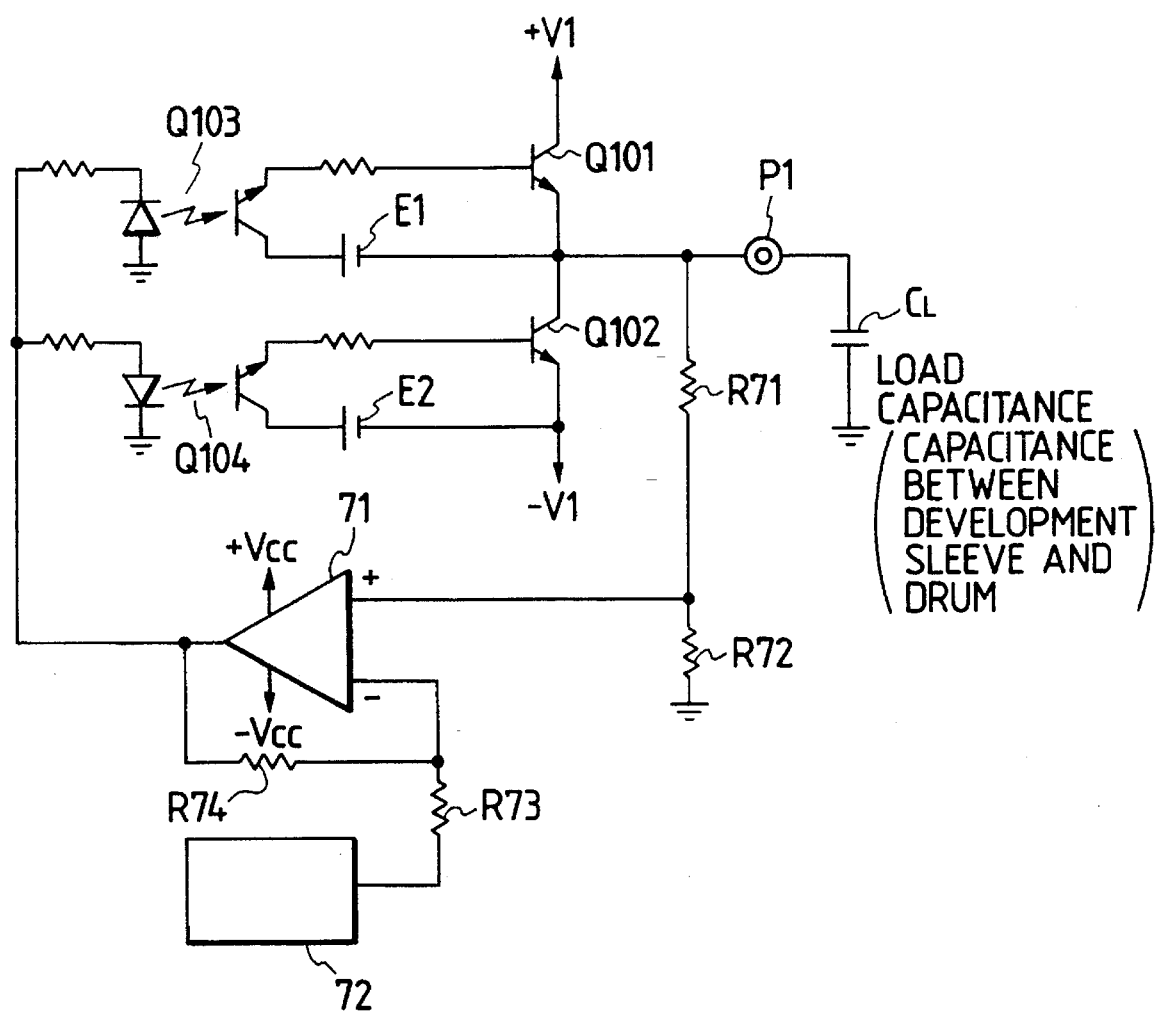
FIG. 18 is a circuit diagram of an embodiment 9.

FIG. 18 is a circuit diagram of an embodiment 9, including a high-speed error amplifier 71, and a reference signal generator 72. The output voltage is divided into a predetermined ratio by resistors R71, R72, and the divided voltage is compared in the high-speed error amplifier 71 with the output of the reference signal generator 72. If the former is higher than the reference signal, the error amplifier 71 provides a positive output to turn on a photocoupler Q104, thereby activating a negative-side switch Q102. On the other hand, if the former is lower than the reference signal, the error amplifier 71 provides a negative output to turn on a photocoupler Q103, thereby driving a positive-side switch Q101. In this manner there can be obtained, at the output terminal P1, multi-value output voltages with fast upshift and downshift, corresponding to the reference signal from the generator 72.

[Embodiment 10]

Figure 19:
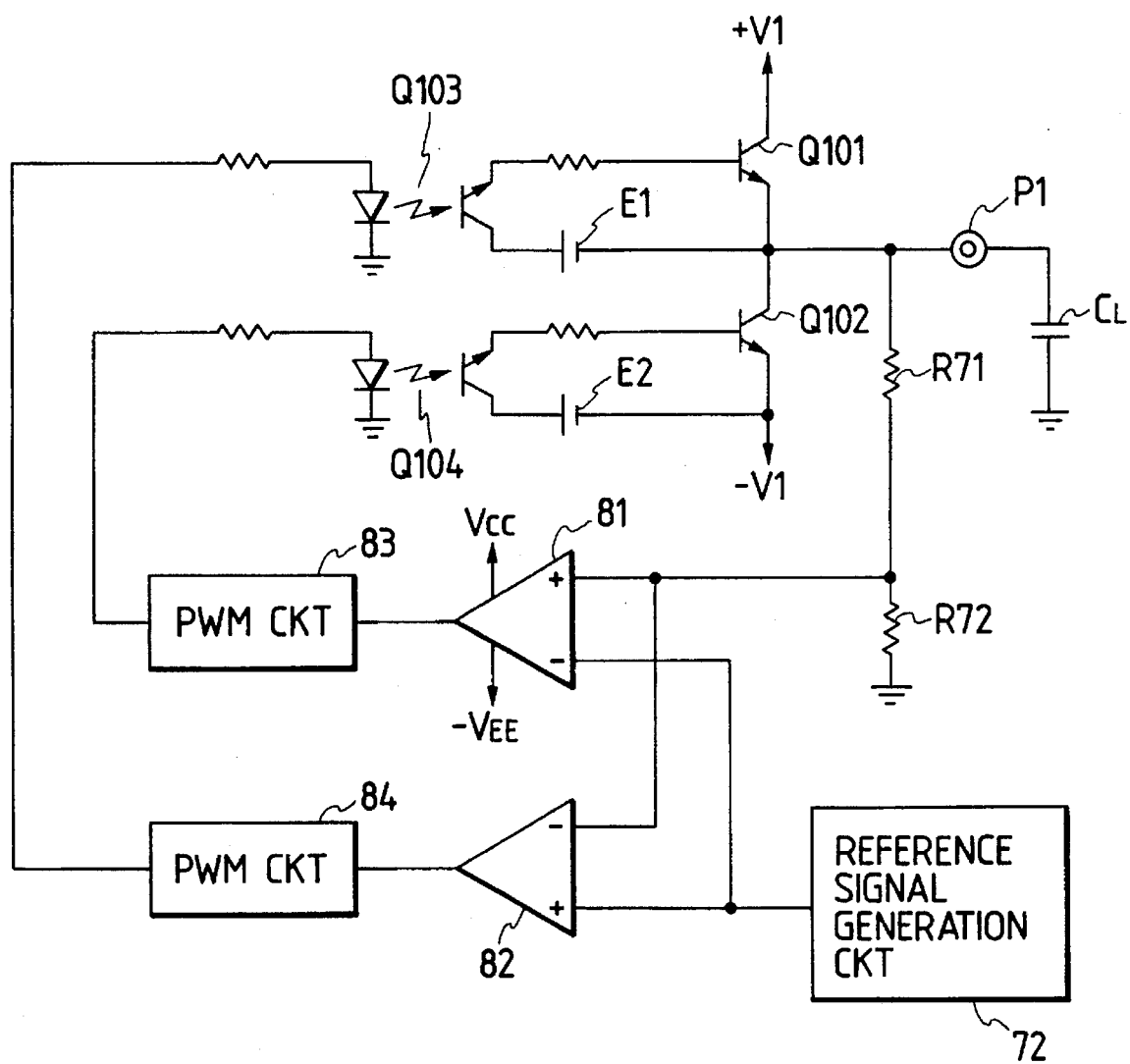
FIG. 19 is a circuit diagram of an embodiment 10.

FIG. 19 is a circuit diagram of an embodiment 10, including high-speed error amplifiers 81, 82, and PWM circuits 83, 84.

The output voltage is divided by resistors R71, R72, and the divided voltage is compared with the output of a reference signal generator 72, in the error amplifiers 81, 82, of which outputs are supplied to the PWM circuits 83, 84 for pulse width controlling photocouplers Q103, Q104. Consequently the switching of high-voltage transistors Q102, Q102 is controlled, and the speed of upshift and downshift can be increased without increase in the power loss. In this manner there can be obtained, at the output terminal P1, multi-value output voltages with fast upshift and downshift.

[Embodiment 11]

Figure 20:
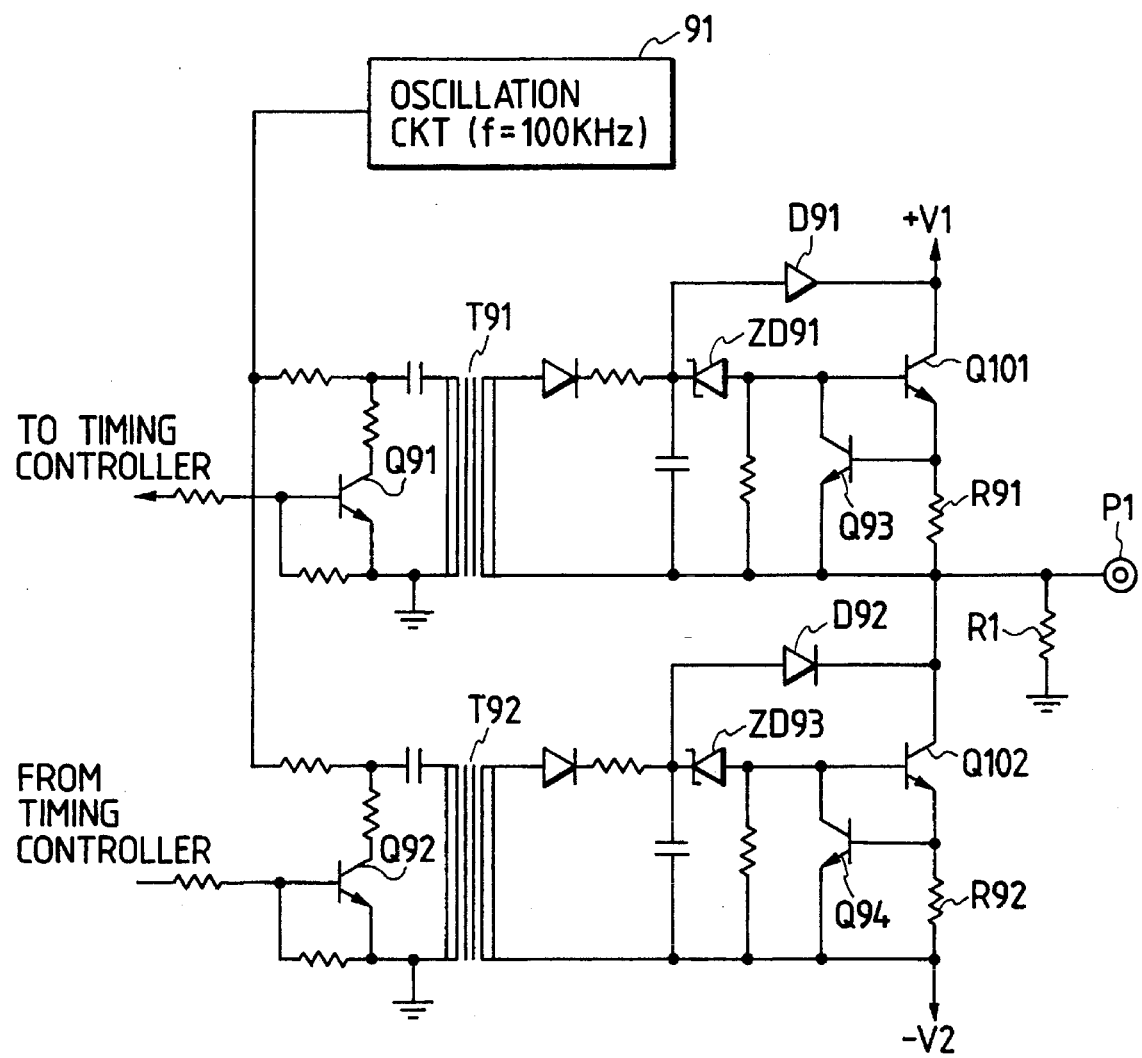
FIG. 20 is a circuit diagram of an embodiment 11.

FIG. 20 is a circuit diagram of an embodiment 11, which employs pulse transformers T91, T92 instead of the photocouplers Q103, Q104 in the embodiment 7. In addition, the high-voltage transistors Q101, Q102 are driven with a constant current, in order to prevent destruction by an excessive current. Also in order to prevent that the high-voltage transistors Q101, Q102 are saturated and are turned on simultaneously by a lowered switching speed, resulting from the accumulation of the minority carriers, a saturation preventing circuit is provided between the collector and the base in each transistor.

An oscillation circuit 91 of about 100 KHz provides an oscillation signal, through resistors and capacitors, to the primary sides of the pulse transformers T91, T92. A timing controller 101 controls transistors Q91, Q92 respectively connected to said primary sides, thereby controlling the supply of the output of the oscillation circuit 91 to said transformers, thus driving the high-voltage transistors Q101, Q102.

The constant-current driving circuits for the high-voltage transistors Q101, Q102 detect the collector currents thereof by resistors R91, R92 inserted in the emitters, and, when the detected voltages reach the base-emitter voltages of transistors Q93, Q94 of which collectors are connected to the bases of the transistors Q101, Q102, bypass the base currents thereof to said transistors Q93, Q94 thereby maintaining the collector currents of the transistors Q101, Q102 at a constant maximum value. The saturation preventing circuits for the high-voltage transistors Q101, Q102 are composed of high-voltage diodes D91, D92 and Zenar diodes ZD91, ZD92, connected between the collectors and the bases of said transistors Q101, Q102. The Zenar voltage of said Zenar diodes ZD91, ZD92 is selected sufficiently higher than the forward voltage of the high-voltage diodes D91, D92. When the collector-emitter voltage of the high-voltage transistors Q101, Q102 becomes lower than the Zenar voltage, the rectified currents at the secondary sides of the pulse transformers T91, T92 flow to the collectors of the high-voltage transistors Q101, Q102 through the high-voltage diodes D91, D92, whereby the base currents are limited and the saturation can be avoided. The constant-current driving circuits and the saturation preventing circuits in the present embodiment can naturally be applied also to the foregoing embodiments 7 to 10.

[Embodiment 12]

Figure 21:
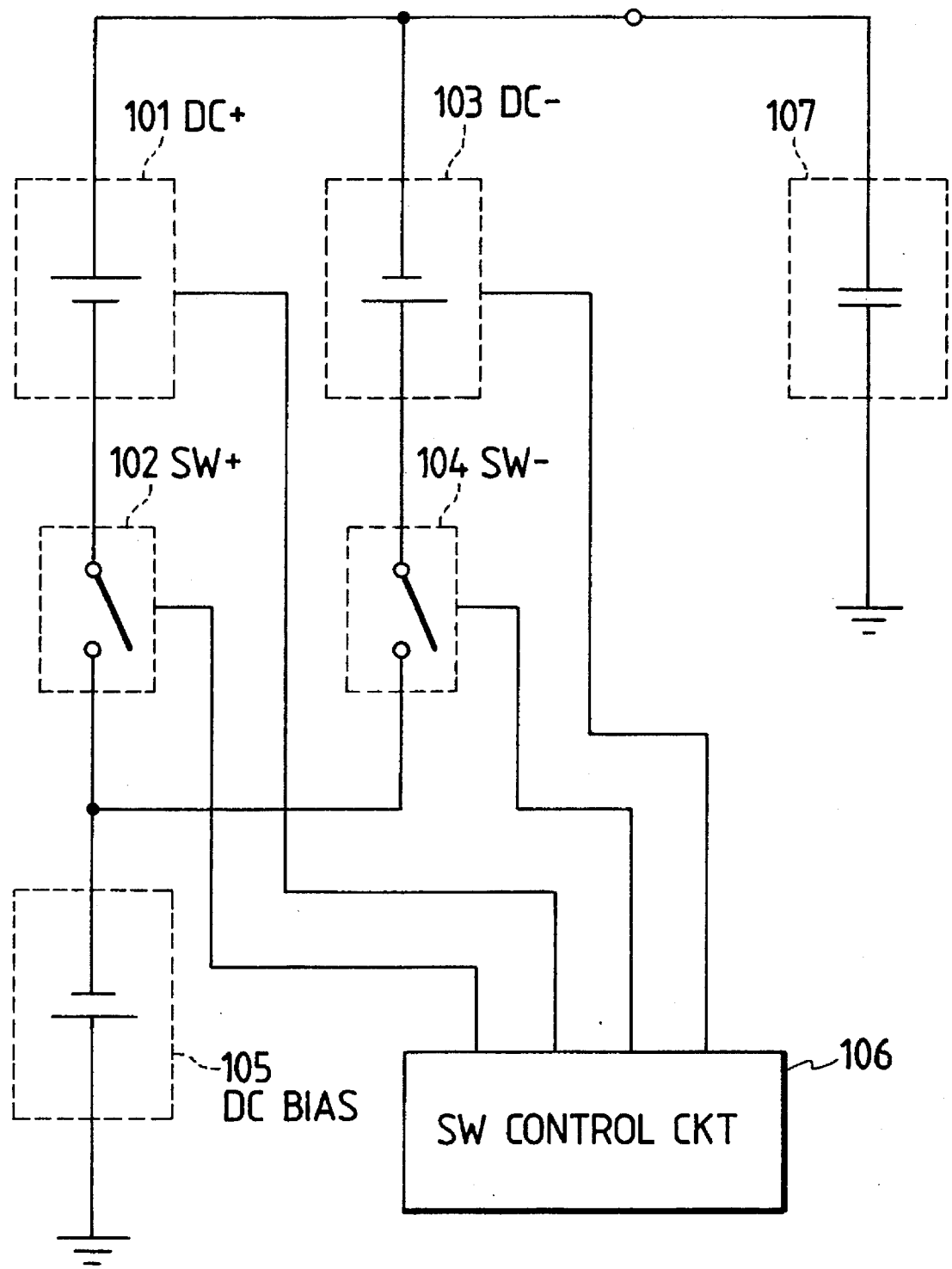
FIG. 21 is a view of the basic circuit configuration of an embodiment 12.

FIG. 21 is a view of the basic circuit configuration of an embodiment 12, wherein provided are a positive high DC voltage generation circuit 101; a switch 102 for controlling the connection of said generation circuit 101 to a developing unit 107 constituting a load; a negative high DC voltage generation circuit 103; a switch 104 for controlling the connection of said generation circuit 103 to the developing unit 107; a high DC voltage generation circuit 105 applying a positive high DC voltage to a high AC voltage; and a switching control circuit 106 controlling the positive high DC voltage generation circuit 101, the positive-side switch 102, the negative high DC voltage generation circuit 103 and the negative-side switch 104 (hereinafter respectively represented as DC+, SW+, DC− and SW−) at arbitrary timings.

Figure 22:
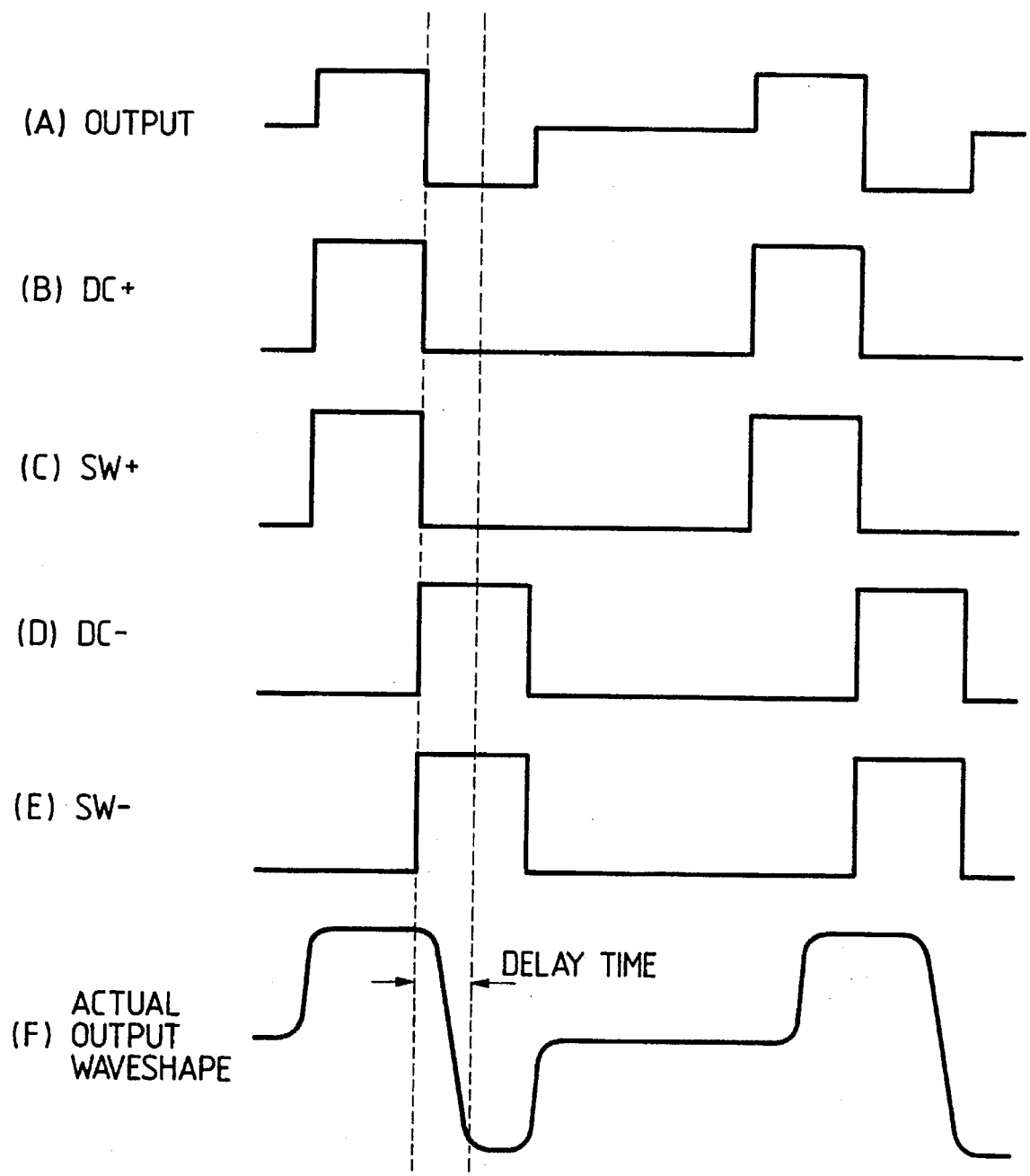
FIG. 22 is a timing chart according to a conventional method in the configuration shown in FIG. 12.

FIG. 22 is a timing chart when the basic circuit shown in FIG. 21 is operated in the conventional method. In order to obtain an AC output wave shown in (A), the DC voltage generation circuits and the switches are turned on and off at timings shown in (B) to (E). In the actual operation, however, the downshift from the positive side to the negative side is delayed as shown in (F), whereby the duty ratio becomes deviated to the positive side, or the downshift wave form is deteriorated.

This is presumably due to a storage in the positive-side switch SW+, resulting in a long cut-off time.

Figure 23:
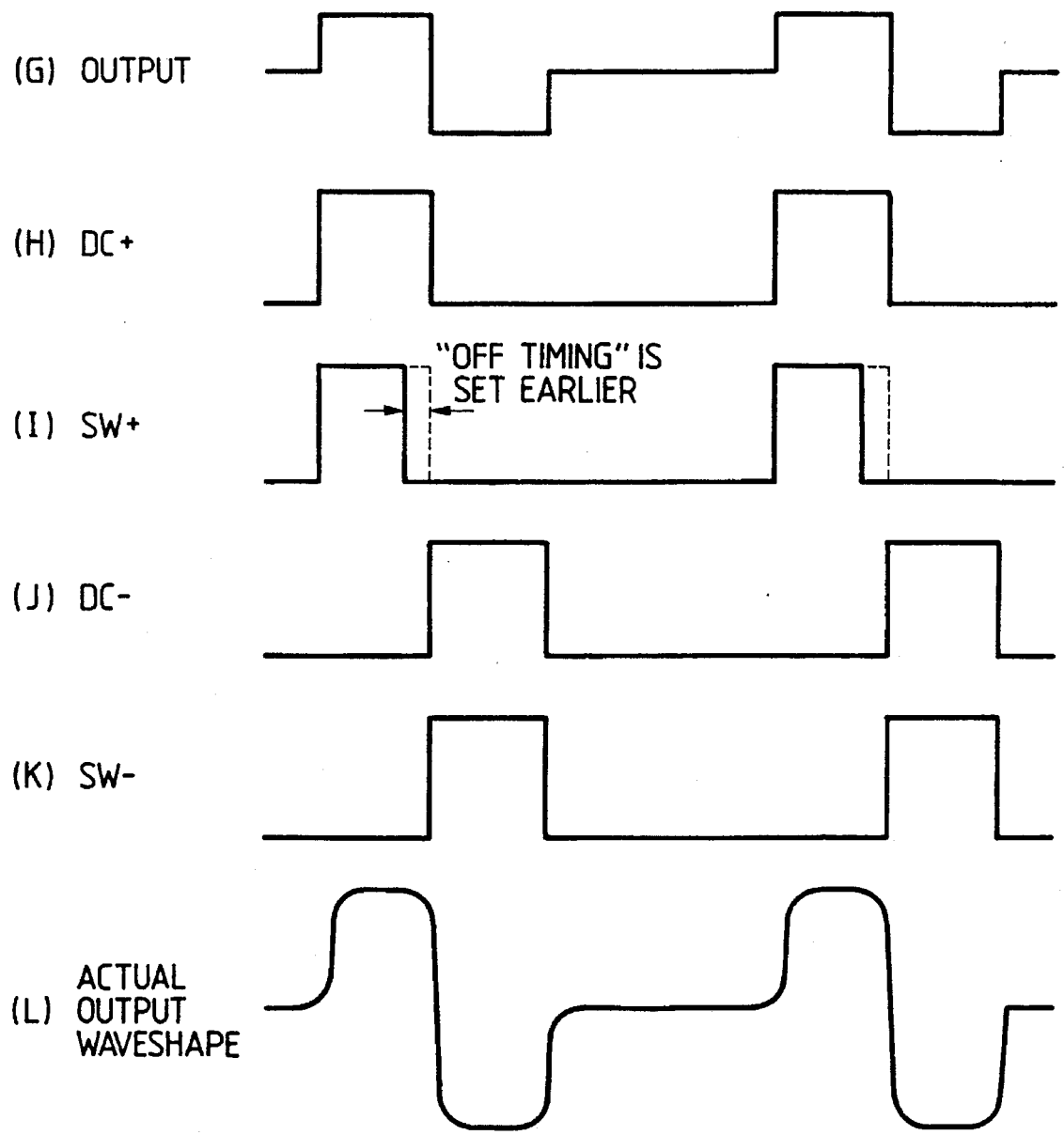
FIG. 23 is a timing chart of the embodiment 12.

The above-mentioned drawback is resolved in the present embodiment, by a function as shown in the timing chart in FIG. 23. Instead of the operation of said switch SW+ with the timing shown by (C) in FIG. 22, it is turned off earlier by a predetermined time (storage time of the switch SW+) as indicated in (I) in FIG. 23, thereby absorbing the delay in switching resulting from the storage time, and realizing a voltage wave form, to be supplied to the developing unit, with steep upshift and downshift required for high image quality.

In the present embodiment, the output from the output terminal is directly switched from the positive side to the negative side, but, in case of direct switching from the negative side to the positive side, the turn-off timing of the negative-side switch SW− can be made earlier by a predetermined time.

[Embodiment 13]

Figure 24:
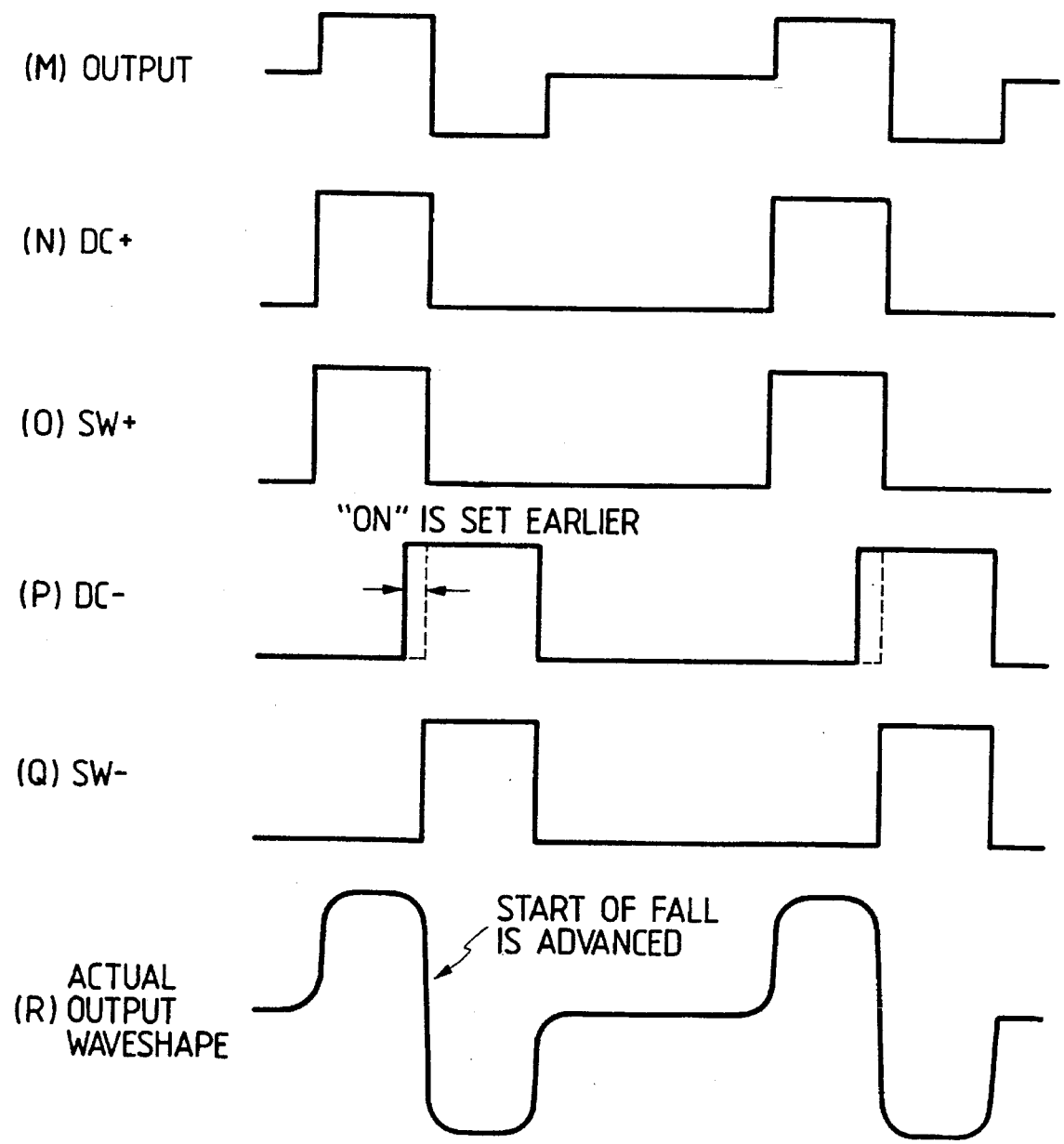
FIG. 24 is a timing chart of an embodiment 13.

FIG. 24 is a timing chart of an embodiment 13, of which basic circuit configuration is same as that of the embodiment 12, shown in FIG. 21.

By turning on the voltage source DC− earlier by the required upshift time as shown by (P) in FIG. 24, there can be provided a desired output wave form as shown in (R), with steep upshift and downshift required for attaining high image quality.

In the present embodiment, the output at the output terminal is directly switched from the positive side to the negative side, but, in case of direct switching from the negative side to the positive side, the turn-on timing of the voltage source DC+ can be made earlier.

In the embodiments 7 to 11, there is not added the high DC voltage source, but such high DC voltage source may be provided also in these embodiments as in other embodiments.

[Embodiment 14]

Figure 25:
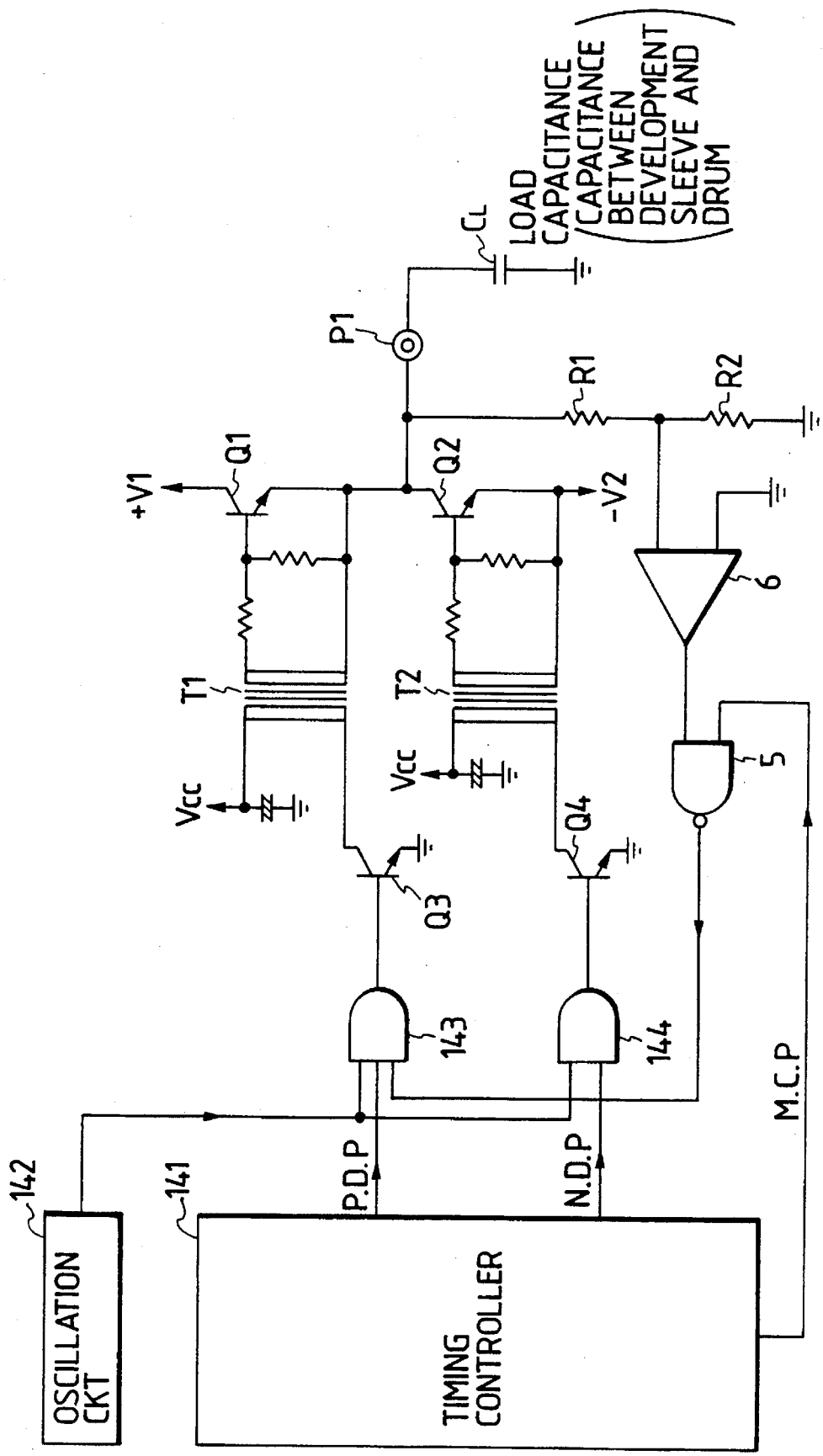
FIG. 25 is a block diagram of an embodiment 14.

FIG. 25 is a block diagram of an embodiment 14 of the present invention.

High voltage transistors Q1, Q2 are mutually connected serially, and are inserted between positive and negative high DC voltage sources +V1, −V2. The voltage generated at the junction point of said high voltage transistors Q1, Q2 is supplied, through the output terminal P1, to the developing sleeve as the AC developing bias.

Between the output terminal P1 and the ground, there is provided a discharging resistor R1, for discharging the capacitance between the developing sleeve and the photosensitive drum.

Said high voltage transistors Q1, Q2 are turned on and off by base current control achieved by a timing controller 141, a high frequency oscillator circuit 142 and a comparator 146 through pulse transformers T1, T2 having switching transistors Q3, Q4 at the primary sides thereof, whereby three-value bias voltages are obtained from the output terminal P1.

Figure 26:
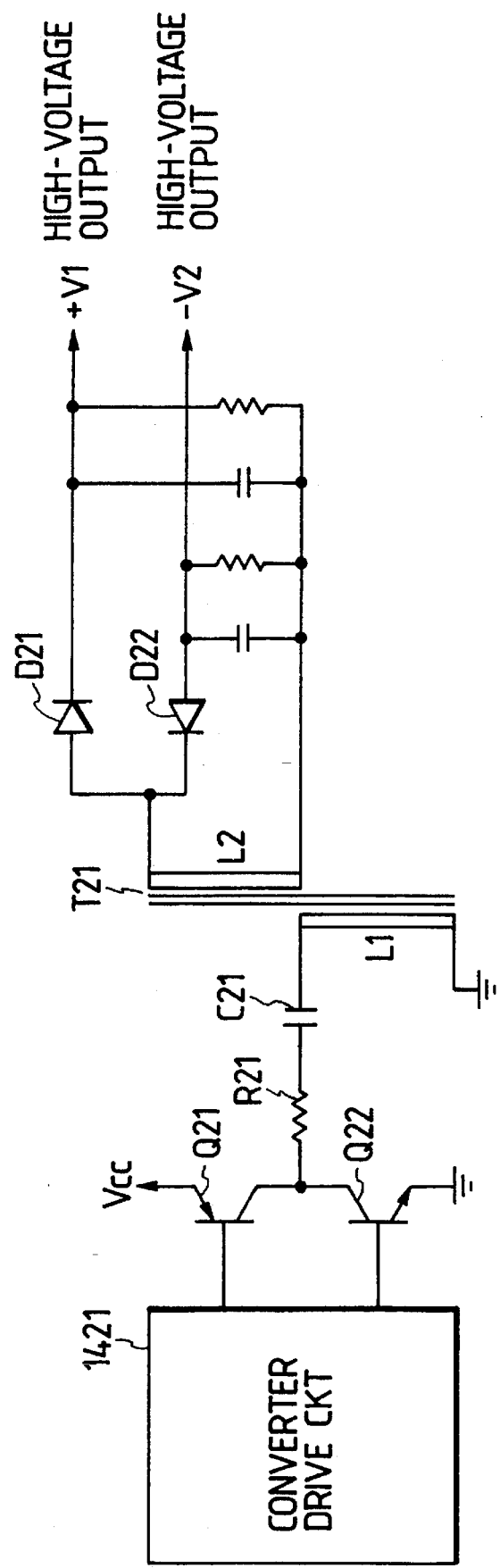
FIG. 26 is a circuit diagram of a high-voltage source in the embodiment 14.

FIG. 26 is a circuit diagram of high voltage sources V1, V2. In a converter transformer T21, the output of a secondary high-voltage coil L2 is rectified by high voltage diodes D21, D22 to respectively provide high voltages +V1 (=1 kV), −V2 (−1 kV). Said converter transformer T21 is driven by operating complementary switches Q21, Q22 at the primary side with a driving circuit 1421.

Figure 27:
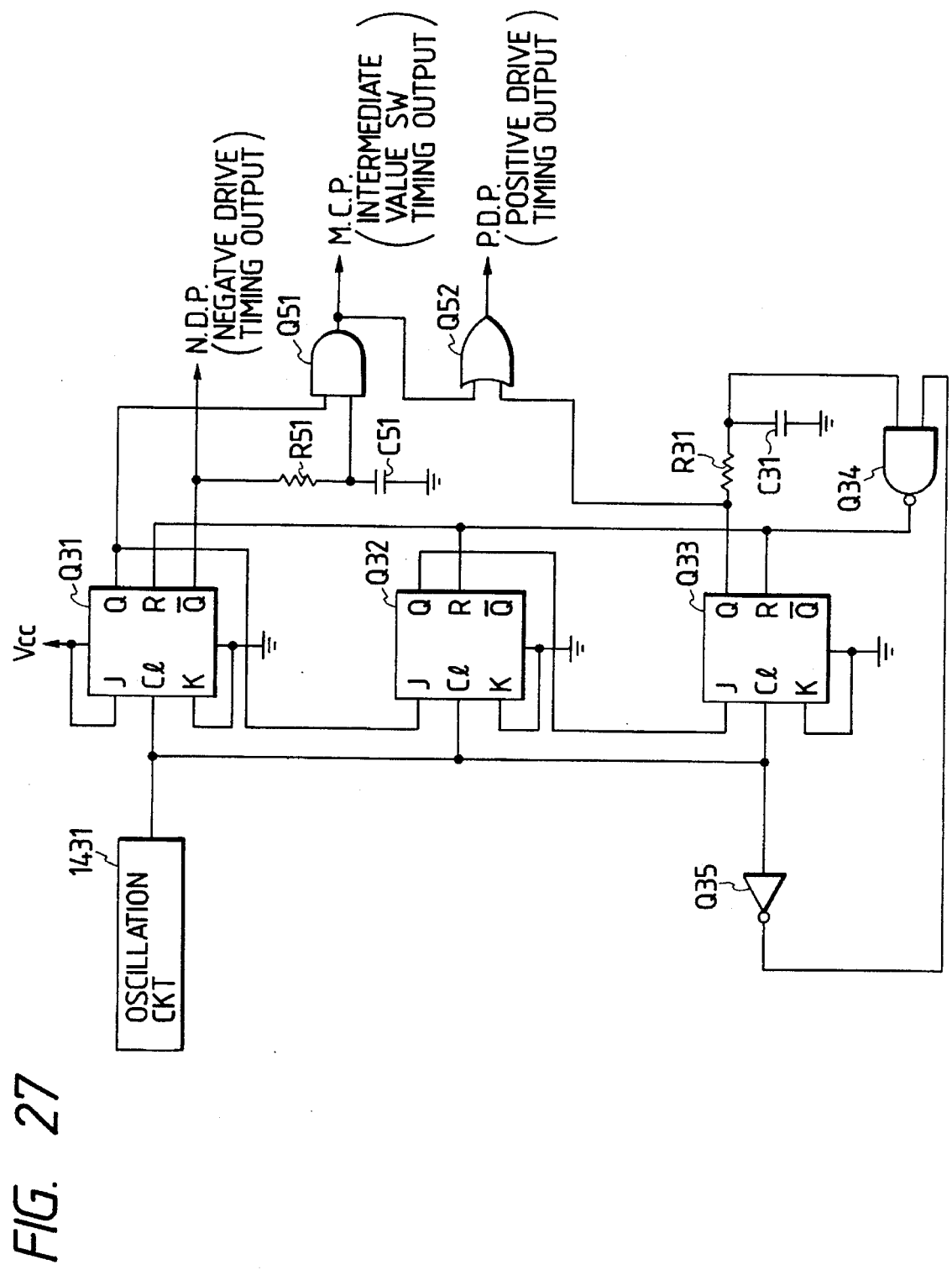
FIG. 27 is a circuit diagram of a timing controller in the embodiment 14.
Figure 28:
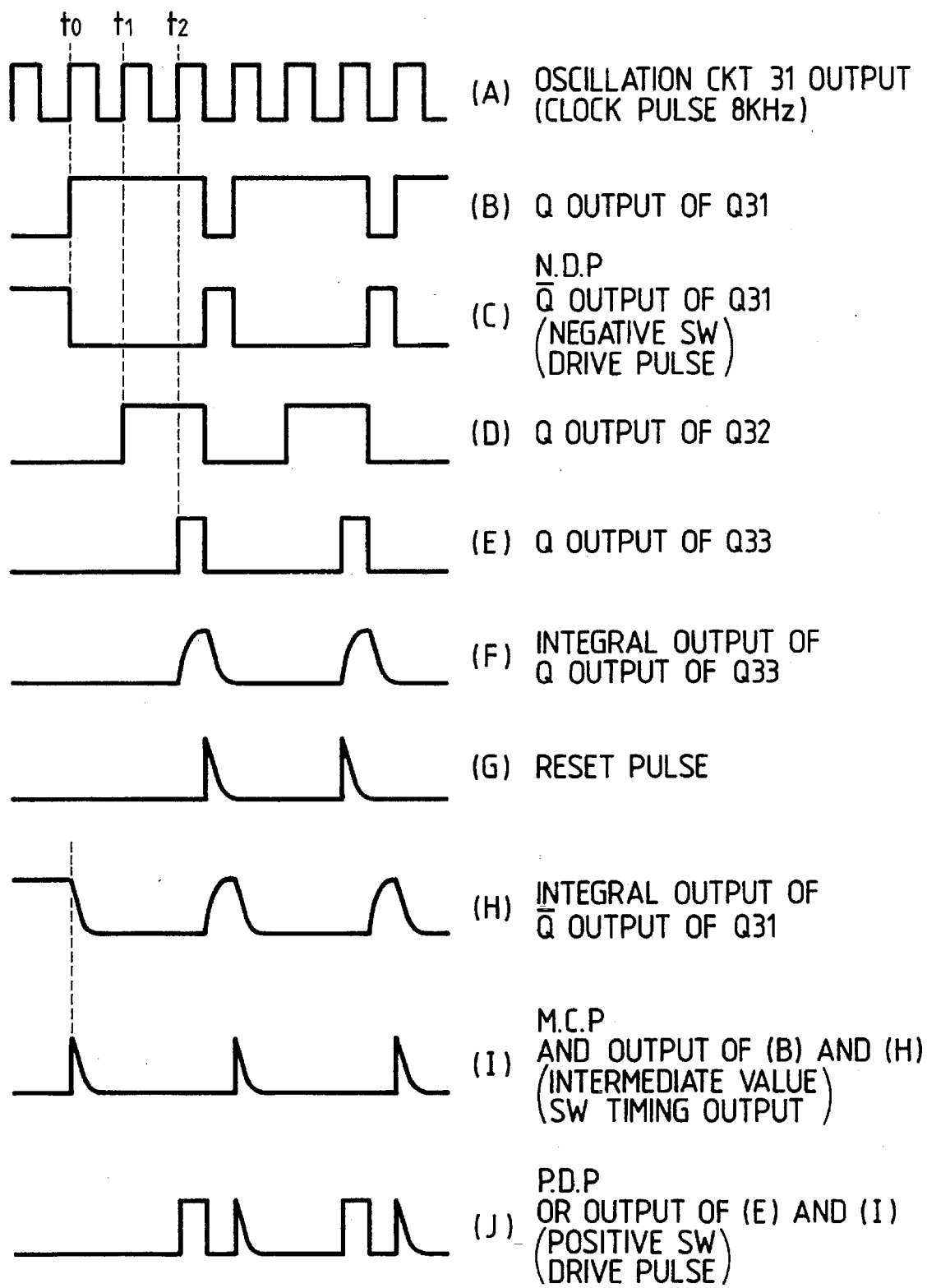
FIG. 28 is a timing chart of the timing controller in the embodiment 14.

FIG. 27 is a detailed circuit diagram of the timing controller 1, and FIG. 28 is a timing chart of the function thereof.

An oscillation circuit 1431 generates clock pulses of a repeating frequency of 8 kHz. Master-slave type flip-flops Q31–Q33 constitute a three-step ring converter, and the Q outputs of said flip-flops are respectively shifted from the low level to the high level at timings t0, t1, t2 shown in (A) in FIG. 28. A NAND gate Q34 receives the integrated Q output of the flip-flop Q33 and the inverted clock signal to provide a reset pulse shown by (G) in FIG. 28.

An AND gate Q51 receives the integrated signal of the inverted output $\overline{Q}$ of the flip-flop Q31 and the non-inverted output Q of the flip-flop Q31 to provide a timing output pulse indicating the output switching to the intermediate value (hereinafter called M.C.P.). The integration time constant of the integration circuit R51, C51 is so selected that the positive-side switch remains conductive until the intermediate value is sufficiently reached, even in consideration of the fluctuation in the load capacitance.

Also a timing output pulse for driving the positive-side switch (hereinafter called P.D.P.) is obtained from an OR gate Q52 receiving the output of the AND gate Q51 and the non-inverted output Q of the flip-flop Q33. Also a timing output signal for driving the negative-side switch (hereinafter called N.D.P.) is obtained by the inverted output $\overline{Q}$ of the flip-flop Q31.

The positive and negative timing pulses P.D.P., N.D.P. are respectively supplied to AND gates 143, 144, which also receive a carrier wave of 100 kHz or higher from an oscillator circuit 412, thereby providing carrier signals respectively modulated with the P.D.P. and N.D.P.

The outputs of said AND gates 143, 144 are respectively supplied to the bases of the primary side driving transistors Q1, Q2 of the pulse transformers T1, T2.

The three-value bias outputs are detected by a voltage dividing circuit consisting of resistors R1, R2, which also serve to maintain the output at the intermediate (ground) level.

When the output exceeds the ground level, the output of the comparator 146 is inverted to the high level, which is supplied, together with the M.C.P., to a NAND gate 145 thereby shifting the output of the AND gate 143 to the low level state and turning off the transistors Q3, Q1. Consequently the transistors Q1, Q2 are both turned off, so that the potential of the output terminal P1 is maintained close to the ground potential.

In this manner the high voltage transistors Q1, Q2 are turned on and off under the control of the timing controller 1, thereby providing three-value bias voltages.

[Embodiment 15]

Figure 29:
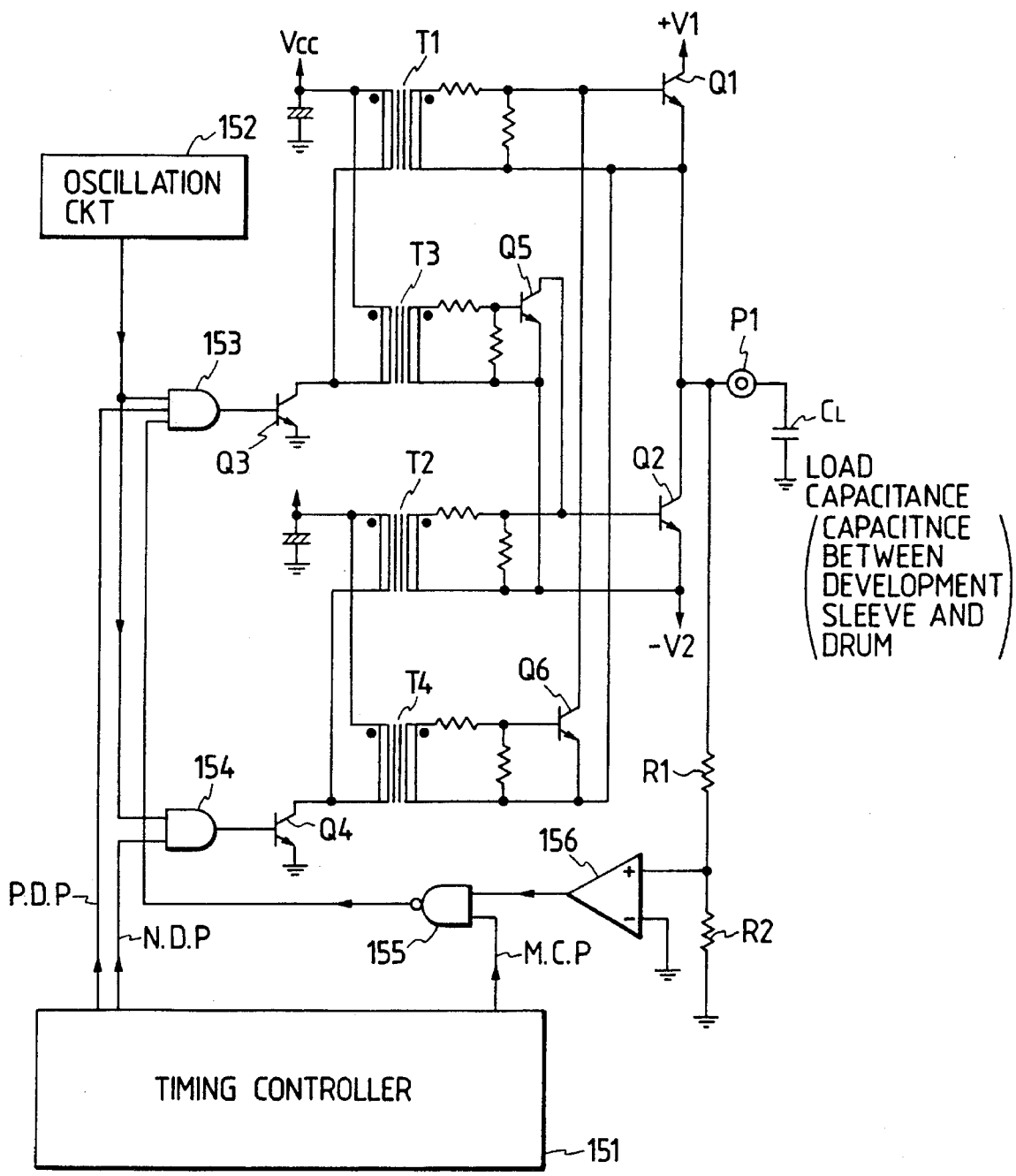
FIG. 29 is a block diagram of an embodiment 15.

FIG. 29 is a block diagram of an embodiment 15 of the present invention.

The foregoing embodiment 14 may be associated with the following drawback. In the timing of charging the load capacitance in the positive direction, the high voltage transistor Q1 has to be conductive while the transistor Q2 has to be maintained shut off. However the collector of the transistor Q2 receives a steep pulse potential of a large amplitude by the switching of the transistor Q1, and said pulse potential of said collector is fed back, by the base-collector capacitance, to the base thereby rendering the transistor Q2 conductive. Also in the timing of charging in the negative direction, a phenomenon of simultaneous conductive state of the transistors Q1, Q2 may occur in the identical manner. Such simultaneous conduction of the high voltage transistors Q1, Q2 causes a shortcircuited state of the positive and negative high voltage sources, thus inducing a significant power loss and a significant deterioration in the upshift speed of the output, and eventually leading to the destruction of the transistors Q1, Q2.

In order to secure the shut-off state of the transistors Q1, Q2, the embodiment 15 additionally contains transistors Q6, Q5 of a low voltage and a low impedance for shortcircuiting the base and emitter of said high voltage transistor at the shut-off state thereof, and a driving circuit therefor.

Pulse transformers T3, T4 are provided for driving the bases of the transistors Q5, Q6. In the timing of charging in the positive direction, when the AND gate 153 provides a high-level output, the primary side driving transistor Q3 for the pulse transformers T1, T3 is rendered conductive, thereby turning on the transistors Q1, Q5. As the transistor Q5 in the conductive state shortcircuits the base and emitter of the transistor Q2, which is not rendered conductive even by the feedback of a speed pulse at the collector.

Also in the timing of charging in the negative direction, the transistor Q6 is rendered conductive and shortcircuits the base and emitter of the transistor Q1, which is thus prevented from becoming conductive by the feedback of the pulse potential at the collector.

As explained above, it is rendered possible to completely prevent the simultaneous conduction of the high voltage transistors Q1, Q2, and to provide three-value bias voltages with a significantly increased upshift speed.

[Embodiment 16]

Figure 30:
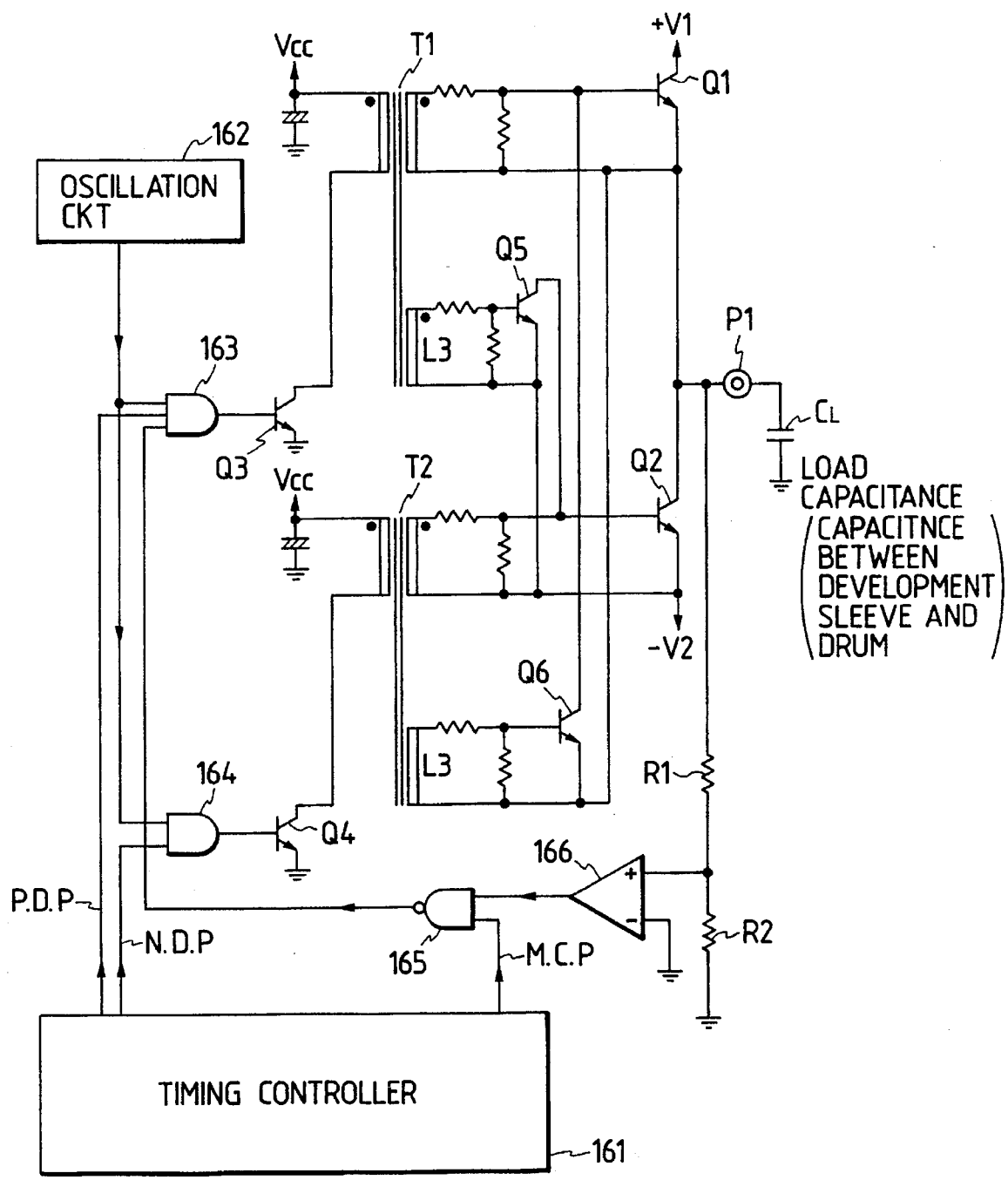
FIG. 30 is a block diagram of an embodiment 16.

FIG. 30 is a block diagram of an embodiment 16, in which the pulse transformers T3, T4 in the embodiment 15 are respectively replaced by tertiary coils L3 provided at the secondary sides of the pulse transformers T1, T2 and which can exhibit same effects and advantages as in said embodiment 15.

[Embodiment 17]

Figure 31:
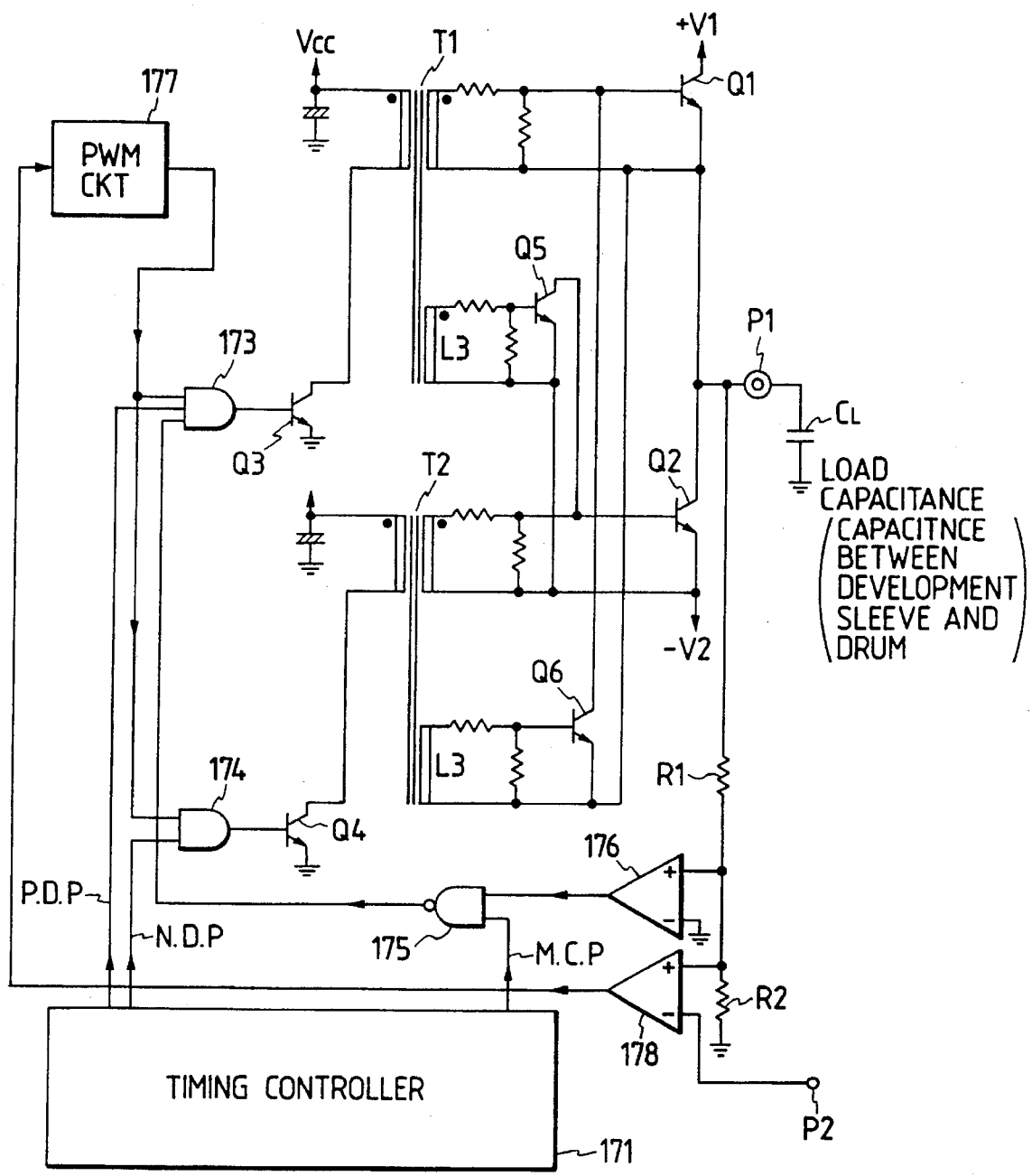
FIG. 31 is a block diagram of an embodiment 17.

FIG. 31 is a block diagram of an embodiment 17 of the present invention.

In the foregoing embodiments 14 to 16, there may result a considerable overshoot at the returning to the intermediate (ground) level, because of a delay in the detection of the ground level of the output by the comparator, a signal delay in the logic circuits or in the pulse transformer driving circuits, a delay in the switching of the high voltage transistors or the charging time of the load capacitance.

The present embodiment is to reduce the duration of conduction of the high voltage transformers as a predetermined level before reaching the ground potential, in order to suppress the overshooting caused by various signal delays.

The detected potential at the output terminal P1 is compared with the ground level in a comparator 176, and also compared with a predetermined negative potential supplied to a terminal P2, in a comparator 178. The potential supplied to said terminal P2 is so selected as to minimize the overshooting for nominal load capacitance. The output of the comparator 178 is supplied to a PWM circuit 177 to switch the output pulse duration to a predetermined values, thereby suppressing the charging speed.

The above-explained configuration allows to reduce the overshooting at the downshift of the three-value bias voltages.

[Embodiment 18]

Figure 32:
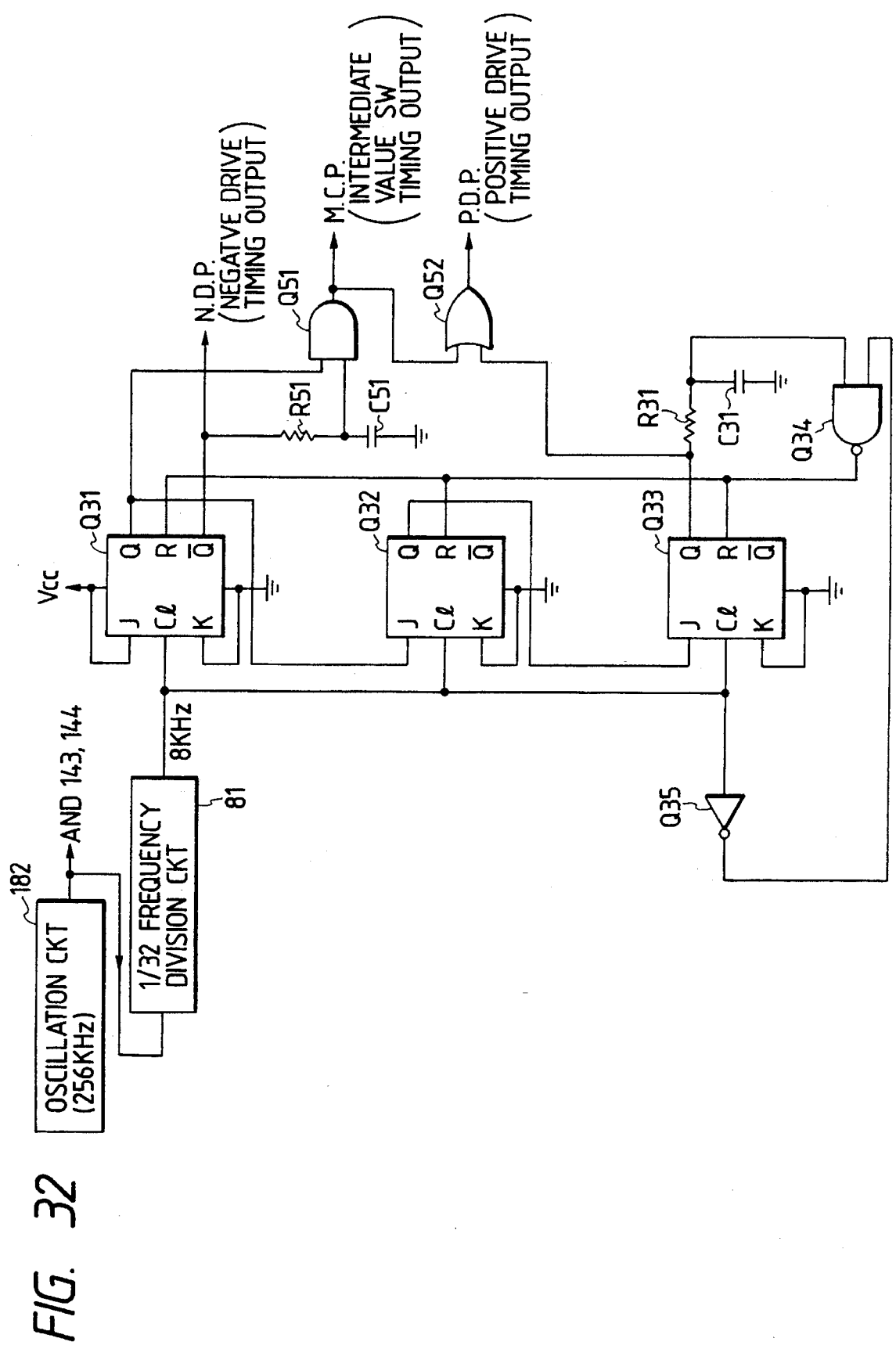
FIG. 32 is a circuit diagram of a timing controller in an embodiment 18.
Figure 33:
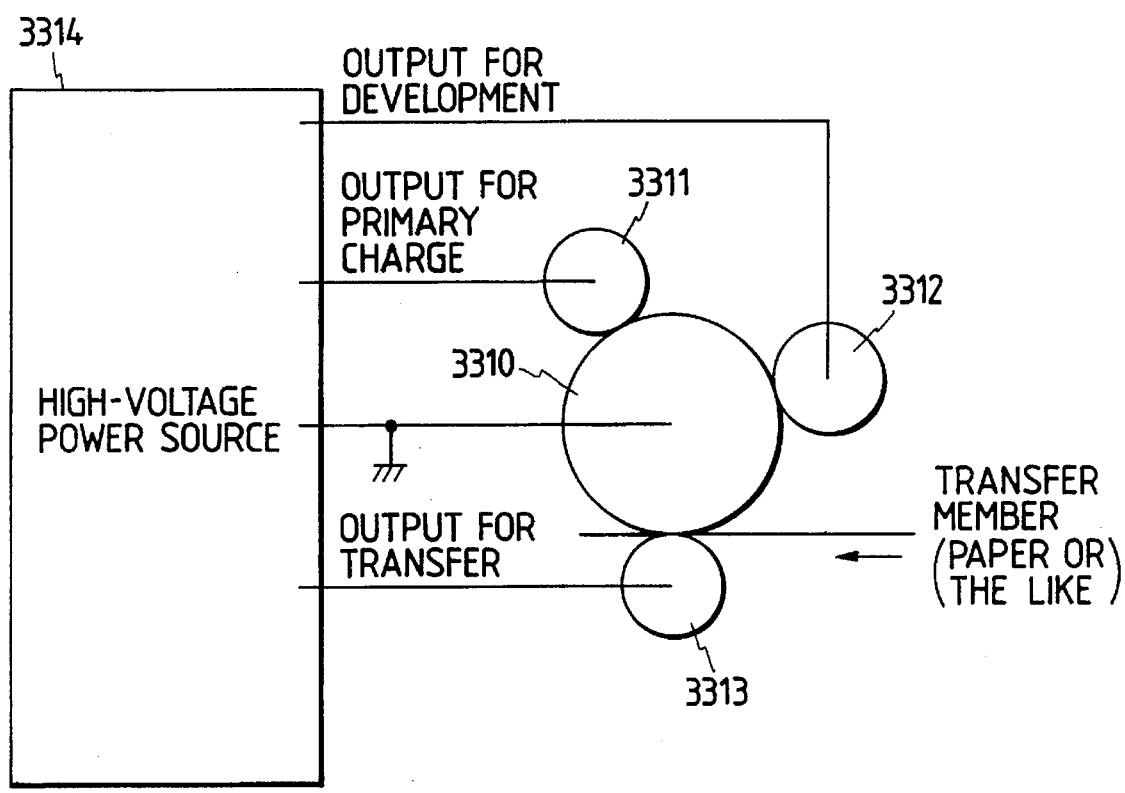
FIG. 33 is a partial block diagram of an image forming apparatus.

FIG. 32 is a circuit diagram of a timing controller in an embodiment 18, of which other configuration is same as that in the embodiment 14.

In the timing controller of the present embodiment, the oscillator circuit 143 of the embodiment 14 shown in FIG. 27 is replaced by a frequency division circuit 81, for dividing the output (256 kHz) of the oscillator circuit 142 in FIG. 25 to a frequency of 8 kHz.

This circuit structure significantly reduces the jitter in the upshift portion, downshift portion and converging portion to the intermediate value in the output wave form.

The configuration of the timing controller of the present embodiment may also be employed in the embodiment 16 or 17.

As explained in the foregoing, the embodiments 14 to 18 provide a developing bias source circuit, in which a timing control circuit selectively turns on and off first and second high voltage switch circuits according to the detection signal of an output detection circuit and a predetermined timing signal, while a discharging resistor connected between the output terminal and the ground discharges the load capacitance, whereby said first and second high voltage switch circuits alternately connect positive and negative high voltage sources to the output terminal, with the ground level provided in between, thus providing the developing unit with three-value AC bias voltages and thereby improving the developing performance of the image forming apparatus.

More specifically, there can be obtained following advantages:

1) Image development with a higher density and with reduced background smudge is rendered possible, in comparison with the cases of the conventional square or sinusoidal AC developing bias voltage;

2) High-speed upshift and downshift, important for improving the image quality, are obtained since the outputs of positive and negative high voltage sources are switched by high-speed high-voltage electronic switches;

3) High-speed on/off control of positive and negative high voltage sources with bidirectional switches allows to connect said positive and negative voltage sources in parallel manner to the load, thereby achieving a high efficiency with reduced heat generation and with reduced cost;

4) The overshooting and sag at the timing of convergence to the intermediate value can be minimized;

5) It is made possible to completely prevent the simultaneous conduction of two high-voltage transistors, resulting from the feedback of the collector potential through the collector-base capacitance of said transistors, thereby achieving a high efficiency, a high-speed upshift and a highly stable operation;

6) The jitter in the upshift portion, the downshift portion or the converting portion to the intermediate value, in the output wave form can be significantly reduced by obtaining the timing signals for switching to the positive, negative and intermediate output values by dividing the frequency of the carrier signal for pulse transformer driving.

As explained in the foregoing, the present invention provides a three-value power supply device of a desired output amplitude, with fast upshift and downshift. Said power supply device may be utilized for providing the developing bias voltages, in order to obtain a hard copy of a high density, a high resolving power and reduced background smudge. Also the invention described in the claim 8 can avoid the deterioration or destruction of the switching transistors, since they are driven with a constant current in an unsaturated state.

The present invention is not limited to the foregoing embodiments but is subject to various modifications and applications, within the scope and spirit of the appended claims.

What is claimed is:

1. A three-value power supply device comprising:
   a high frequency-driven converter of a positive output;
   a high frequency-driven converter of a negative output;
   an output terminal; and
   high-speed switch means for supplying or not supplying said output terminal with the positive or negative output at desired timings of frequency sufficiently lower than the high frequency.

2. A three-value power supply device provided with a high frequency-driven converter of a positive output, a high frequency-driven converter of a negative output; and high-speed switch means for supplying or not supplying the output terminal with said positive or negative output at desired timings of a frequency sufficiently lower than said high frequency, comprising:
   amplitude detection means for individually detecting the amplitudes of the positive and negative outputs appearing at said output terminal;
   first comparator means for comparing the amplitude of the positive output, detected by said amplitude detection means, with a first reference value;
   second comparator means for comparing the amplitude of the negative output, detected by said amplitude detection means, with a second reference value;
   first high-frequency driving means controlled by the output of said first comparator means and adapted to drive said high frequency-driven converter of the positive output; and
   second high-frequency driving means controlled by the output of said second comparator means and adapted to drive said high frequency-driven converter of the negative output.

3. A three-value power supply device comprising:
   a high frequency-driven converter of a positive output;
   a high frequency-driven converter of a negative output;
   an output terminal receiving the outputs of said two converters; and
   high-speed switch means for supplying the primary side of converting transformers of said two converter with a high frequency signal at desired timings of a frequency sufficiently lower than said high frequency, or short-circuiting said primary side thereby supplying or not supplying said output terminal with the positive or negative output.

4. A three-value power supply device comprising:
   a high voltage source of a positive output;
   a high voltage source of a negative output;
   first and second switching elements serially connected between said high voltage sources of positive and negative outputs;
   timing control means for selectively turning on and off said first and second switching elements; and
   an output terminal connected to the junction point between said first and second switching elements.

5. A three-value power supply device according to claim 1, wherein the timing control means is adapted to selectively turning on the first or second switching element only for a desired duration, at a timing when the output potential is switched from the positive or negative peak to the intermediate level.

6. A three-value power supply device comprising:
   a high voltage source of a positive output;
   a high voltage source of a negative output;
   first and second switching elements serially connected between said high voltage sources of positive and negative outputs;
   an output terminal connected to the junction point between said first and second switching elements;
   output detection means for detecting the output of said output terminal;
   comparator means for comparing the output of said output detection means with a reference signal; and
   control means for selectively turning on and off said first and second switching elements.

7. A three-value power supply device comprising:
   a high voltage source of a positive output;
   a high voltage source of a negative output;
   first and second switching elements serially connected between said high voltage sources of positive and negative outputs;
   an output terminal connected to the junction point between said first and second switching elements;
   output detection means for detecting the output of said output terminal;
   two comparator means for comparing the positive and negative amplitude components of the output of said output detection means with respective reference signals; and
   two control means for generating PWM signals, for respective supply to said first and second switching elements, according to the outputs of said two comparator means.

8. A three-value power supply device according to claim 7, wherein said first and second switching elements are associated with a constant-current driving circuit for constant-current driving of said switching elements, and a saturation preventing circuit for preventing that the on-voltage of said switching elements becomes lower than a predetermined level.

9. A three-value power supply device comprising:
   high voltage generation means of a positive output;
   high voltage generation means of a negative output;
   positive-side switch means for on/off supply control of the output of said high voltage generation means of positive output to an output terminal;
   negative-side switch means for on/off supply control of the output of said high voltage generation means of negative output to the output terminal; and
   timing control means for on/off control, at the timings of output level switching, of each of the high voltage generation means of positive output, the high voltage generation means of negative output, the positive-side switch means and the negative-side switch means.

10. A three-value power supply device according to claim 9, wherein the timing control means is adapted, at the switching of the output at the output terminal from a positive value to a negative value, to turn off the positive-side switch means prior, by a predetermined time, to the turn-on of the negative-side switch means.

11. A three-value power supply device according to claim 9, wherein the timing control means is adapted, at the switching of the output at the output terminal from a positive value to a negative value, to turn on the high voltage generation means of negative output prior, by a predetermined time, to the turn-off of the high voltage generation means of positive output.

12. A three-value power supply device according to claim 10, wherein the timing control means is adapted, also at the switching of the output at the output terminal from a negative value to a positive value, to turn off the negative-side switch means to turn on the high voltage generation means of positive output, earlier by a predetermined time.

13. An image forming apparatus in which the developing bias is obtained by superposing, with the output of a desired DC power source, the output of a three-value power supply device according to claim 1.

14. A developing bias source circuit for power supply to a developing unit for developing a latent image formed on a photosensitive member of an image forming apparatus, comprising:

positive and negative high voltage sources;

first and second high voltage switch circuits for connecting said positive or negative high voltage source to an output terminal for power supply to said developing unit;

a discharging resistor connected between the output terminal and the ground for discharging a load capacitance; an output detection circuit for detecting the output; and a timing control circuit for selective on/off control of said first and second high voltage switch circuits, according to the detection signal from said output detection circuit and a predetermined timing signal.

15. A developing bias source circuit according to claim 14, wherein said timing control circuit is adapted to control said first and second high voltage switch circuits in such a manner that a cycle consisting of positive and negative outputs of a predetermined duration in alternate manner and of an intermediate (ground) level of a predetermined duration with the shut-off of said positive and negative outputs, is repeated with a predetermined frequency.

16. A developing bias source circuit according to claim 14, wherein, at the timing of switching from the positive or negative peak level to the ground level, the output terminal is switched to the negative or positive high voltage source, and, after the output detection circuit detects that the output has reached the ground level, the high voltage switch circuits are shut off.

17. A developing bias source circuit according to claim 14, wherein each of said first and second high voltage switch circuit includes:

a first pulse transformer;

a high voltage transistor of which base and emitter are connected, through a predetermined input circuit, to the secondary side of said first pulse transformer;

a low voltage transistor of a low impedance of which collector and emitter are respectively connected to the base and the emitter of said high voltage transistor; and a second pulse transformer of which secondary coil is connected, through a predetermined input circuit, to the base and the emitter of said transistor of low impedance;

wherein said transistor of low impedance is so controlled as to become conductive when the corresponding first or second high voltage switch circuit is shut off.

18. A developing bias source circuit according to claim 14, wherein said first and second high voltage switch circuits are controlled by signals, obtained by pulse modulation, with the output frequency, of a carrier signal of a high frequency at least equal to times of said output frequency, and entered by current insulating means such as a pulse transformer or a photocoupler.

19. A developing bias source device according to claim 14, wherein a pulse modulated signal, for controlling the timing of switching of positive and negative outputs or of convergence to the intermediate value is obtained by dividing the frequency of a carrier signal with a predetermined ratio.

* * * * *

UNITED STATES PATENT AND TRADEMARK OFFICE
CERTIFICATE OF CORRECTION

PATENT NO. : 5,567,997  Page 1 of 3
DATED : October 22, 1996
INVENTOR(S) : KOJI SUZUKI, ET AL.

It is certified that error appears in the above-indentified patent and that said Letters Patent is hereby corrected as shown below:

SHEET 27 OF THE DRAWINGS:

Figure 27, "NEGATVE" should read --NEGATIVE--.

SHEET 29 OF THE DRAWINGS:

Figure 29, "CAPACITNCE" should read --CAPACITANCE--.

SHEET 30 OF THE DRAWINGS:

Figure 30, "CAPACITNCE" should read --CAPACITANCE--.

SHEET 31 OF THE DRAWINGS:

Figure 31, "CAPACITNCE" should read --CAPACITANCE--.

SHEET 32 OF THE DRAWINGS:

Figure 32, "NEGATVE" should read --NEGATIVE--.

COLUMN 1:

Line 19, "are" should read --are being--;
    Line 21, "are" should read --is--; and
    Line 46, "drawbacks;" should read --drawbacks:--.

COLUMN 3:

Line 24, "means" should be deleted;
    Line 55, "positive-side" should read --positive-side switch--; and
    Line 58, "9," should read --(9),--.

UNITED STATES PATENT AND TRADEMARK OFFICE
CERTIFICATE OF CORRECTION

PATENT NO. : 5,567,997
DATED : October 22, 1996
INVENTOR(S) : KOJI SUZUKI, ET AL.

It is certified that error appears in the above-indentified patent and that said Letters Patent is hereby corrected as shown below:

COLUMN 4:

Line 8, "paragraph" should read --paragraphs--; and
    Line 10, "configuration" should read --configurations--, and "paragraph" should read --paragraphs--.

COLUMN 7:

Line 49, "to apply" should read --applies--.

COLUMN 12:

Line 10, "Q102," should read --Q101,--.

COLUMN 15:

Line 66, "values," should read --value,--.

COLUMN 16:

Line 6, "other" should read --another--, and "same" should read --the same--; and
    Line 32, "obtained" should read --obtained the--.

COLUMN 17:

Line 24, "the" should read --an--; and
    Line 53, "converter" should read --converters--.

UNITED STATES PATENT AND TRADEMARK OFFICE
CERTIFICATE OF CORRECTION

PATENT NO. : 5,567,997
DATED : October 22, 1996
INVENTOR(S) : KOJI SUZUKI, ET AL.

It is certified that error appears in the above-indentified patent and that said Letters Patent is hereby corrected as shown below:

COLUMN 19:

Line 15, "to" should read --or to--.

COLUMN 20:

Line 32, "to" should read --to 10--; and
Line 35, "device" should read --circuit--.

Signed and Sealed this

Fifteenth Day of April, 1997

Attest:

BRUCE LEHMAN

Attesting Officer

Commissioner of Patents and Trademarks